United States Patent
Xu et al.

(10) Patent No.: US 11,277,306 B2
(45) Date of Patent: Mar. 15, 2022

(54) SENDING INFORMATION OF A NETWORK REPOSITORY FUNCTION INSTANCE STORING NETWORK FUNCTION INSTANCE INFORMATION

(71) Applicant: Huawei Technologies Co., Ltd., Shenzhen (CN)

(72) Inventors: Ruiyue Xu, Shanghai (CN); Kai Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/783,326

(22) Filed: Feb. 6, 2020

(65) Prior Publication Data

US 2021/0044481 A1     Feb. 11, 2021

Related U.S. Application Data

(63) Continuation of application No. PCT/CN2018/099179, filed on Aug. 7, 2018.

(30) Foreign Application Priority Data

Aug. 7, 2017  (CN) .......................... 201710665551.3

(51) Int. Cl.
   *H04L 12/24*     (2006.01)
   *H04L 29/08*     (2006.01)
   (Continued)

(52) U.S. Cl.
   CPC ......... *H04L 41/0823* (2013.01); *H04W 72/02* (2013.01); *H04L 67/327* (2013.01)

(58) Field of Classification Search
   CPC .......................... H04L 41/0823; H04L 67/327
   (Continued)

(56) References Cited

U.S. PATENT DOCUMENTS 5,664,126 A * 9/1997 Hirakawa ......... H04L 29/12009
                                            707/999.01
10,142,994 B2 * 11/2018 Lee ..................... H04W 72/048
(Continued)

FOREIGN PATENT DOCUMENTS

CN     102377629 A     3/2012
CN     102547804 A     7/2012
(Continued)

OTHER PUBLICATIONS

3rd Generation Partnership Project; Technical Specification Group Services and System Aspects; Study on Architecture for Next Generation System, 3GPP TR 23.799, 3GPP Organizational Partners (2016) (Year: 2016).*
(Continued)

*Primary Examiner* — David P Zarka
(74) *Attorney, Agent, or Firm* — Conley Rose, P.C.

(57) ABSTRACT

A network function information management method, where the method includes: obtaining, by a management network element, identification information of a network repository function (NRF) instance, where the NRF instance stores information about a network function (NF) instance, and the identification information is used to indicate the NRF instance associated with the NF instance; and sending, by the management network element, a first message to the NF instance or a management unit of the NF instance, where the first message includes the identification information of the NRF instance; or establishing, by the management network element, an association relationship between the NF instance and the NRF instance based on the identification information of the NRF instance. The method helps the NF instance register with the NRF instance, update the information about the NF instance to the NRF instance, or query (Continued)

information about another NF instance from the NRF instance.

20 Claims, 11 Drawing Sheets

(51) Int. Cl.
  *H04L 41/0823* (2022.01)
  *H04W 72/02* (2009.01)
  *H04L 67/63* (2022.01)
(58) Field of Classification Search
  USPC ........................................................ 709/223
  See application file for complete search history.

(56) References Cited

U.S. PATENT DOCUMENTS

| | | | |
|---|---|---|---|
| 10,171,939 B2* | 1/2019 | Kim | H04W 4/02 |
| 10,498,880 B2* | 12/2019 | Sonntag | H04L 63/0853 |
| 10,743,250 B2* | 8/2020 | Watfa | H04W 36/06 |
| 10,820,185 B2* | 10/2020 | Faccin | H04W 76/28 |
| 2013/0170502 A1 | 7/2013 | Chen et al. | |
| 2014/0201374 A1 | 7/2014 | Ashwood-Smith et al. | |
| 2016/0112309 A1* | 4/2016 | Hikichi | H04L 45/66 370/392 |
| 2017/0099612 A1 | 4/2017 | Salot et al. | |
| 2017/0171015 A1* | 6/2017 | Lin | H04L 47/78 |
| 2018/0103368 A1* | 4/2018 | Son | H04W 36/0022 |
| 2019/0037409 A1* | 1/2019 | Wang | H04W 16/04 |
| 2019/0364541 A1* | 11/2019 | Ryu | H04W 76/25 |
| 2020/0028921 A1* | 1/2020 | Cai | H04L 63/102 |
| 2020/0053803 A1* | 2/2020 | Youn | H04W 76/10 |
| 2020/0120589 A1* | 4/2020 | Velev | H04W 60/04 |
| 2020/0177677 A1* | 6/2020 | Yang | H04L 67/1097 |

FOREIGN PATENT DOCUMENTS

| | | | | |
|---|---|---|---|---|
| CN | 105247826 A | | 1/2016 | |
| EP | 3402232 B1 * | | 11/2019 | ............ H04W 48/18 |
| WO | 2016121834 A1 | | 8/2016 | |
| WO | 2017075757 A1 | | 5/2017 | |
| WO | WO-2018171316 A1 * | | 9/2018 | ............ H04L 67/16 |

OTHER PUBLICATIONS

An et al., Architecture Modularisation for Next Generation Mobile Networks, IEEE, 1-6 (2017) (Year: 2017).*
ATIS 3GPP Specification, ATIS.3GPP.23.501V1520, WRSC, 1-217 (Year: 2018).*
3GPP TS 23.501 V1.2.0 pp. 1-166 (Jul. 2017) (Year: 2017).*
English machine-translation of WO 2017-075757 (Year: 2017).*
China Mobile, et al., "23.501: High level description of NF service registration," XP051257926, SA WG2 Meeting #S2-120, S2-172359, Mar. 27-31, 2017, Busen, Korea, 2 pages.
3GPP TS 23.501 V1.2.0, "3rd Generation Partnership Project; Technical Specification Group Services and System Aspects; System Architecture for the 5G System; Stage 2 (Release 15)," XP051336684, Jul. 2017, 166 pages.
3GPP TR 23.799 V2.0.0, "3rd Generation Partnership Project; Technical Specification Group Services and System Aspects; Study on Architecture for Next Generation System (Release 14)," XP051199311, Nov. 2016, 523 pages.
3GPP TS 28.622 V14.1.0, "3rd Generation Partnership Project; Technical Specification Group Services and System Aspects; Telecommunication management; Generic Network Resource Model (NRM) Integration Reference Point (IRP); Information Service (IS) (Release 14)," Jun. 2017, 23 pages.

* cited by examiner

```
┌─────────────────────────────────────────────────────────┐
│ A management network element obtains identification     │  S701
│ information of an NRF instance, where the NRF instance  │
│ stores information about an NF instance                 │
└─────────────────────────────────────────────────────────┘
                            │
                            ▼
┌─────────────────────────────────────────────────────────┐
│ The management network element establishes an           │  S702
│ association relationship between the NF instance and    │
│ the NRF instance based on the identification            │
│ information of the NRF instance                         │
└─────────────────────────────────────────────────────────┘
```

FIG. 7

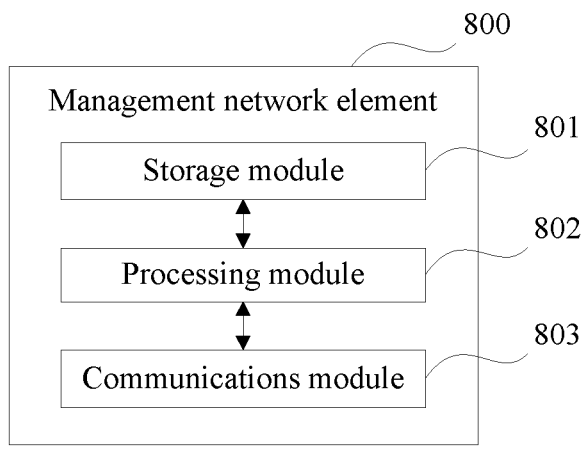

FIG. 8A

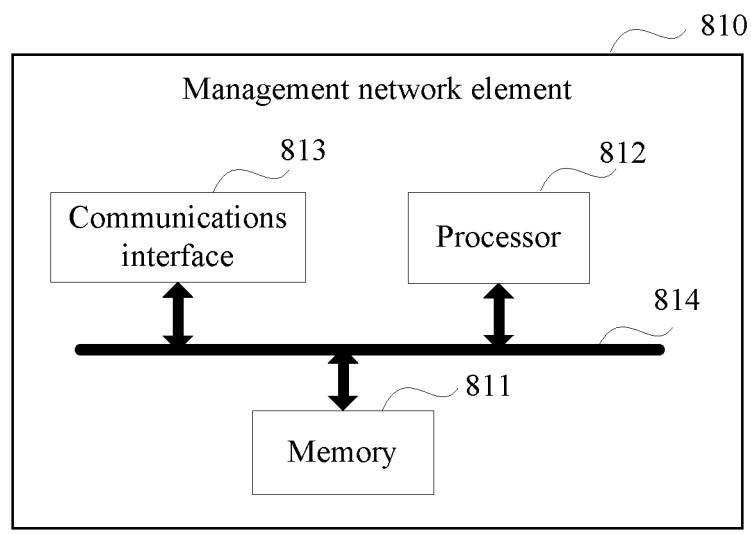

FIG. 8B

SENDING INFORMATION OF A NETWORK REPOSITORY FUNCTION INSTANCE STORING NETWORK FUNCTION INSTANCE INFORMATION

CROSS-REFERENCE TO RELATED APPLICATIONS

This application is a continuation of International Patent Application No. PCT/CN2018/099179, filed on Aug. 7, 2018, which claims priority to Chinese Patent Application No. 201710665551.3, filed on Aug. 7, 2017. The disclosures of the aforementioned applications are hereby incorporated by reference in their entireties.

TECHNICAL FIELD

Embodiments of this application relate to the communications field, and in particular, to a network function information management method and a related device.

BACKGROUND

As communications technologies develop, an increasingly higher requirement is imposed on a next-generation network. For example, the next-generation network needs to meet different requirements of different industries and different users for a network, and pertinently provides personalized network services for different users. A service-oriented architecture of the network is an important technical means to achieve this goal. Based on the service-oriented architecture of the network, a network side may dynamically adjust a network route based on a service request of a terminal or based on both a service request of a terminal and a real-time status of the network, in order to meet the service request of the terminal.

To implement the service-oriented architecture of the network, a network repository function (NRF) instance is introduced. The NRF instance is a logical entity used to store and maintain information about a network function (NF) instance. When receiving a service request of a user, the NF instance may determine a next hop route by querying, from the NRF instance, an NF instance that can provide a network service requested by the user.

In a service-oriented architecture of an existing network, there is usually only one NRF instance, and an NF instance may directly initiate procedures such as registration and a query to the NRF instance. However, with continuous development of the service-oriented architecture, a plurality of NRF instances are desired for storing information about NF instances, such that information of NF instances with different features, for example, in different networks or at different locations, can be separately stored in different NRF instances in an isolated manner. In this case, how to determine specific NF instances whose information is stored and maintained by each NRF instance is currently an urgent problem that needs to be resolved for optimizing the service-oriented architecture of the network.

SUMMARY

Embodiments of this application describe a network function information management method and a related device, to optimize a service-oriented architecture of a network.

According to an aspect, an embodiment of this application provides a network function information management method. The method includes: obtaining, by a management network element, identification information of a network repository function (NRF) instance, where the NRF instance stores information about a network function (NF) instance, and the identification information of the NRF instance is used to indicate the NRF instance associated with the NF instance; sending, by the management network element, a first message to the NF instance or a management unit of the NF instance, where the first message includes the identification information of the NRF instance; determining, by the NF instance, the associated NRF instance based on the first message; and registering with the NRF instance, updating the information about the NF instance to the NRF instance, or querying information about another NF instance from the NRF instance. According to the solution in this embodiment of this application, when there are a plurality of NRF instances, the management network element can indicate, to the NF instance, the NRF instance associated with the NF instance, such that the NF instance can directly register with the NRF instance and update the information about the NF instance to the NRF instance, thereby optimizing a configuration procedure. Alternatively, the NF instance can determine a specific NRF instance from which the information about the other NF instance is queried.

According to another aspect, the method includes: obtaining, by a management network element, identification information of an NRF instance, where the NRF instance stores information about an NF instance, and the identification information of the NRF instance is used to indicate the NRF instance associated with the NF instance; and establishing, by the management network element, an association relationship between the NF instance and the NRF instance based on the identification information of the NRF instance. According to the solution in this embodiment of this application, when there is a plurality of NRF instances, the identification information of the NRF instance is obtained to establish the association relationship between the NF instance and the NRF instance. This helps subsequently instruct the NF instance to register with the NRF instance, update the information about the NF instance to the NRF instance, or query information about another NF instance from the NRF instance.

In a possible implementation, the first message further includes the information about the NF instance.

In a possible implementation, the management network element configures the identification information of the NRF instance in a managed object of the NF instance.

In a possible implementation, a manner for obtaining the identification information of the NRF instance may include one or all of the following: receiving a management request message, where the management request message includes the identification information of the NRF instance or indication information of the NRF instance, and the indication information of the NRF instance is used to obtain the identification information of the NRF instance; or obtaining the identification information of the NRF instance or indication information of the NRF instance that is described in a network template, where the indication information of the NRF instance is used to obtain the identification information of the NRF instance.

In a possible implementation, the indication information of the NRF instance may include at least one piece of isolation requirement information, security information, location information, user information, or network information.

In a possible implementation, the first message includes the information about the NF instance, and the management request message may further include the information about the NF instance.

In a possible implementation, the first message further includes registration indication information, and the registration indication information is used to instruct the NF instance whether to register with the NRF instance.

In a possible implementation, the identification information of the NRF instance may include at least one of an identifier of the NRF instance, a name of the NRF instance, or a network address of the NRF instance.

In a possible implementation, the information about the NF instance may include at least one of an instance type, address information, domain name information, slice information of a network slice to which the NF instance belongs, a service area, information about an NF group to which the NF instance belongs, or a discovery policy.

According to another aspect, an embodiment of this application provides another network function information management method. The method includes: receiving, by an NF instance, a first message, where the first message includes identification information of an NRF instance that stores information about the NF instance, and the identification information of the NRF instance is used to indicate the NRF instance associated with the NF instance; and sending, by the NF instance, a second message to the NRF instance after receiving the first message, where the second message includes the information about the NF instance, and the second message is used to instruct the NRF instance to store or update the information about the NF instance; or sending, by the NF instance, a third message to the NRF instance after receiving the first message, where the third message is used to query information about another NF instance from the NRF instance. According to the solution in this embodiment of this application, when there are a plurality of NRF instances, a management network element sends the first message to the NF instance, to indicate the NRF instance associated with the NF instance, such that the NF instance can directly send the second message to the NRF instance to register with the NRF instance and update the information about the NF instance to the NRF instance, thereby optimizing a configuration procedure, or the NF instance can determine the NRF instance and send the third message to the NRF instance to query the information about the other NF instance.

In a possible implementation, the first message further includes the information about the NF instance.

In a possible implementation, the second message is a registration request message of the NF instance or a registration request message of a service corresponding to the NF instance. Before sending the second message to the NRF instance, the NF instance may further receive an activation request message, where the activation request message is used to activate the NF instance or the service corresponding to the NF instance, to trigger the NF instance to send the registration request message to the NRF instance.

In a possible implementation, the NF instance may further send a fourth message to the NRF instance, where the fourth message is used to instruct the NRF instance to delete the information about the NF instance or set the information about the NF instance to be unavailable.

In a possible implementation, the fourth message is a deregistration request message of the NF instance or a deregistration request message of the service corresponding to the NF instance. Before sending the fourth message to the NRF instance, the NF instance may further receive a deactivation request message, where the deactivation request message is used to deactivate the NF instance or the service corresponding to the NF instance, to trigger the NF instance to send the deregistration request message to the NRF instance.

According to still another aspect, an embodiment of this application provides a management network element. The management network element has a function of implementing behavior of the management network element in the foregoing method designs. The function may be implemented by hardware, or may be implemented by hardware by executing corresponding software. The hardware or software includes one or more modules corresponding to the foregoing function.

In a possible design, the management network element includes a processor, and the processor is configured to support the management network element in performing corresponding functions in the foregoing methods. Further, the management network element may include a communications interface, and the communications interface is configured to support communication between the management network element and an NF instance, between the management network element and a management unit of the NF instance, between the management network element and an NRF instance, between the management network element and another management network element, or between the management network element and another device. Further, the management network element may include a memory, and the memory is configured to couple to the processor and store a program instruction and data that are necessary for the management network element.

According to still another aspect, an embodiment of this application provides an NF instance. The NF instance has a function of implementing behavior of the NF instance in the foregoing method designs. The function may be implemented by hardware, or may be implemented by hardware by executing corresponding software. The hardware or software includes one or more modules corresponding to the foregoing function.

In a possible design, the NF instance includes a processor, and the processor is configured to support the NF instance in performing corresponding functions in the foregoing methods. Further, the NF instance may include a communications interface, and the communications interface is configured to support communication between the NF instance and a management network element, between the NF instance and an NRF instance, between the NF instance and a management unit of the NF instance, or between the NF instance and another unit. Further, the NF instance may include a memory, and the memory is configured to couple to the processor and store a program instruction and data that are necessary for the NF instance.

According to still another aspect, an embodiment of this application provides an NRF instance. The NRF instance has a function of implementing behavior of the NRF instance in the foregoing method designs. The function may be implemented by hardware, or may be implemented by hardware by executing corresponding software. The hardware or software includes one or more modules corresponding to the foregoing function.

In a possible design, the NRF instance includes a processor, and the processor is configured to support the NRF instance in performing corresponding functions in the foregoing methods. Further, the NRF instance may include a communications interface, and the communications interface is configured to support communication between the NRF instance and a management network element, between the NRF instance and an NF instance, between the NRF instance and a management unit of the NF instance, or between the NRF instance and another device. Further, the NRF instance may include a memory, and the memory is configured to couple to the processor and store a program instruction and data that are necessary for the NRF instance.

According to still another aspect, an embodiment of this application provides a management unit of an NF instance. The management unit of the NF instance has a function of implementing behavior of the management unit of the NF instance in the foregoing method designs. The function may be implemented by hardware, or may be implemented by hardware by executing corresponding software. The hardware or software includes one or more modules corresponding to the foregoing function.

In a possible design, the management unit of the NF instance includes a processor, and the processor is configured to support the management unit of the NF instance in performing corresponding functions in the foregoing methods. Further, the management unit of the NF instance may include a communications interface, and the communications interface is configured to support communication between the management unit of the NF instance and a management network element, between the management unit of the NF instance and an NRF instance, between the management unit of the NF instance and the NF instance, or between the management unit of the NF instance and another device. Further, the management unit of the NF instance may include a memory, and the memory is configured to couple to the processor and store a program instruction and data that are necessary for the management unit of the NF instance.

According to yet another aspect, an embodiment of this application provides a communications system. The communications system includes the management network element and the NF instance according to the foregoing aspects; or the communications system includes the management network element, the NF instance, and the NRF instance according to the foregoing aspects; or the communications system includes the management network element, the NF instance, the management unit of the NF instance, and the NRF instance according to the foregoing aspects.

According to yet another aspect, an embodiment of this application provides a computer readable storage medium. The computer readable storage medium stores an instruction, and when the instruction is run on a computer, the computer is enabled to perform the methods according to the foregoing aspects.

According to yet another aspect, an embodiment of this application provides a computer program product including an instruction. When the instruction is run on a computer, the computer is enabled to perform the methods according to the foregoing aspects.

Compared to other approaches, in the solutions of the embodiments of this application, the management network element can indicate, to the NF instance, the NRF instance associated with the NF instance, or the management network element can establish the association relationship between the NF instance and the NRF instance, such that the management network element can determine specific NF instances whose information is stored and maintained by each NRF instance. This helps an NF instance initiate procedures such as registration and a query to an NRF instance.

BRIEF DESCRIPTION OF DRAWINGS

FIG. 7 is a schematic flowchart of still another network function information management method according to an embodiment of this application;

FIG. 8A is a schematic structural diagram of a management network element according to an embodiment of this application;

FIG. 8B is a schematic structural diagram of another management network element according to an embodiment of this application;

DESCRIPTION OF EMBODIMENTS

The following describes the embodiments of this application with reference to the accompanying drawings in the embodiments of this application.

Figure 1:
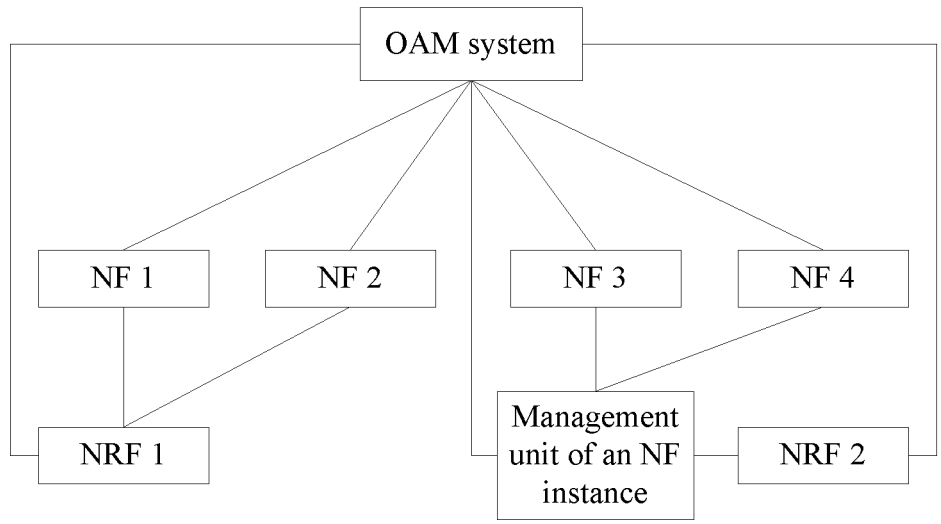
FIG. 1 is a schematic diagram of a possible network architecture according to an embodiment of this application.

FIG. 1 is a schematic diagram of a possible network architecture according to an embodiment of this application. The network architecture includes an operation, administration, and maintenance (OAM) system, a network function (NF) instance, and a network repository function (NRF) instance.

The OAM system is a generic term of various network entities used by operators for network management. Functions of the OAM system mainly include: routine analysis, forecast, planning, and configuration of a network and a service, and routine operation activities such as a test and fault management that are performed on a network and a service of the network.

The NF instance is an independent virtual or physical logical network function that can perform functions such as calculation, storage, and network communication. The NF instance in the embodiments of this application may be an NF instance in a core network (CN), for example, an access management function instance (AMF instance), or a session management function instance (SMF Instance), or may be an NF instance in an access network (AN), for example, a $5^{th}$ Generation (5G) NodeB function instance, an enhanced Long-Term Evolution (eLTE) eNB function instance, or an eNB function instance.

The NRF instance, also referred to as a network repository function instance, is a logical entity configured to store and maintain information about the NF instance. When receiving a service request of a user, the NF instance may determine a next hop route by querying, from the NRF instance, another NF instance that can provide a network service requested by the user.

In the network architecture shown in FIG. 1, the OAM system manages at least one NF instance (an NF 1, an NF 2, an NF 3, and an NF 4 are shown in FIG. 1) and at least one NRF instance (an NRF 1 and an NRF 2 are shown in FIG. 1), and communicates and interacts with the at least one NF instance and the at least one NRF instance. An NF instance may also communicate and interact with an NRF instance corresponding to the NF instance. For example, both the NF 1 and the NF 2 shown in FIG. 1 are associated with the NRF 1. In other words, the NRF 1 stores and maintains information about the NF 1 and the NF 2. In this case, both the NF 1 and the NF 2 can communicate and interact with the NRF 1.

It should be noted that, as shown in FIG. 1, this application is also applicable to a scenario in which a management unit of an NF instance manages a plurality of NF instances in a unified manner. In the scenario, when managing at least one NF instance, the OAM system may send a management message to the at least one NF instance using a management unit of the NF instance. The management unit of the NF instance may be an element management (EM) unit, a network function management (NFM) unit, or a domain management (DM) unit. This is not specifically limited herein.

Figure 2:
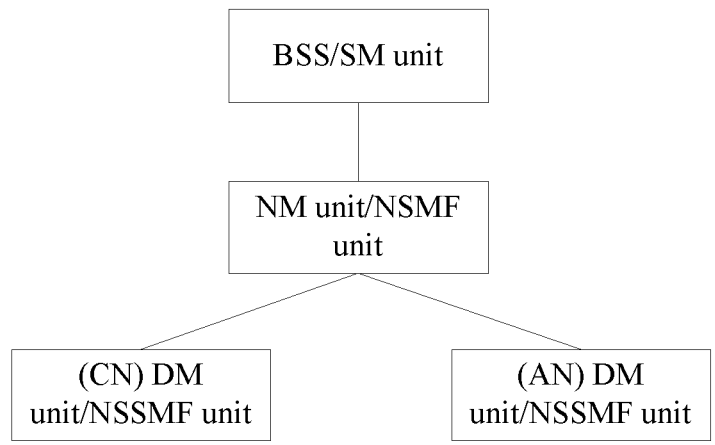
FIG. 2 is a schematic structural diagram of an OAM system according to an embodiment of this application.

Further, FIG. 2 is a schematic structural diagram of an OAM system according to an embodiment of this application. The OAM system includes a business support system (BSS), a network management (NM) unit, and a domain management (DM) unit.

The business support system, or a service management (SM) unit, is configured to: receive a service requirement of a related tenant, convert the service requirement into a requirement related to a network slice, and perform service-related management.

The network management unit may also be referred to as a network slice management function (NSMF) unit, has one or both of an end-to-end network management function and an end-to-end network orchestration function, and may have some or all of the following functions: end-to-end network management (for example, network life cycle management, network template management, network fault management, network performance management, and network configuration management); mapping between an end-to-end network, a subnet, and a network function; coordination of network resources or sub-service level agreements (sub-SLA) that are provided by different domains (such as an access network domain, a core network domain, and a transport network domain); resolving network requirement information into subnet requirement information; and unified orchestration of subnets and network functions that are provided by subdomains, such that subnets or network functions that are provided by different subdomains can meet a target service requirement or a network requirement, for example, an SLA requirement, a key performance indicator (KPI) requirement, and a quality of service (QoS) requirement.

It should be noted that the NM unit is intended for representing a network unit that has the foregoing functions, but does not constitute any limitation on a name of the NM unit. Alternatively, the NM unit may be a cross domain management unit, a cross domain network slice management unit, or another network unit. The NM unit herein may be an independent management unit, or may be a logical entity in any management unit, for example, a logical entity in a network orchestration unit, a network management and orchestration unit, a service management unit, a service orchestration unit, a service management and orchestration unit, or a network function virtualization orchestrator (NFVO). The NM unit may be included in an operations support system (OSS), or may not be included in an OSS.

The foregoing network may also be referred to as a network slice or an end-to-end (E2E) network slice, may include at least a core network (CN) part, an access network (AN) part, and a transport network part. Alternatively, the foregoing network may include any two of the CN part, the AN part, or the TN part. Alternatively, the foregoing network may represent a network of the CN part, a network of the AN part, or a network of the TN part. The foregoing network includes at least one subnet. Logically, a network is a set of network functions. The subnet herein may also be referred to as a network slice subnet.

The domain management unit may also be referred to as a network slice subnet management (NSSMF) unit, has one or both of a subnet management function and a subnet orchestration function, and may have some or all of the following functions: domain management, including subnet life cycle management (creation, update, and deletion), subnet fault management, subnet performance management, subnet configuration management, and the like; service management, including service life cycle management, service fault management, service performance management, service configuration management, and the like; and coordination of network resources (for example, NFs) for unified orchestration.

It should be noted that the DM unit is intended for representing a network unit that has the foregoing functions, but does not constitute any limitation on a name of the DM unit. Alternatively, the DM unit may be a domain slice management unit, a network slice subnet management unit, or another network unit. The DM unit herein may be an independent management unit, or may be a logical entity in any management unit, for example, a network management unit, a network orchestration unit, a network management and orchestration unit, a network element function unit, a service management unit, a service orchestration unit, a domain management unit, a service management and orchestration unit, or an NFVO. The DM unit may be included in an OSS, or may not be included in an OSS.

The foregoing subnet may include one or more of an AN part, a CN part, or a TN part. When a subnet managed by the DM unit includes only the AN part, it may be considered that the management unit of the subnet is an AN DM unit. When a subnet managed by the DM unit includes only the CN part, it may be considered that the management unit of the subnet is a CN DM unit. When a subnet managed by the DM unit includes the AN part and the CN part, it may be considered that the management unit of the subnet is a Mix DM unit.

With reference to FIG. 1 and FIG. 2, in the embodiments of this application, a management network element may be an NM unit or a DM unit depending on different implementation scenarios. In the embodiments of this application, the NM unit may directly manage at least one NF instance and at least one NRF instance, and communicate and interact with the at least one NF instance and the at least one NRF instance. Alternatively, the NM unit may indirectly manage at least one NF instance and at least one NRF instance using the DM unit, and communicate and interact with the at least one NF instance and the at least one NRF instance using the DM unit. Example implementation methods are described in detail in the following embodiments.

In a scenario in which a management unit of an NF instance manages a plurality of NF instances in a unified manner, when managing at least one NF instance, the NM unit or the DM unit may send a management message to the at least one NF instance using the management unit of the NF instance. In other words, the NM unit or the DM unit may send a message to the management unit of the NF instance, and then the management unit of the NF instance sends the message to the NF instance. Because destination terminals of routes are the same, it is directly described in the following embodiments as that the NM unit or the DM unit sends a message to the NF instance, including the case in which the NM unit or the DM unit sends the message to the NF instance using the management unit of the NF instance.

The following further describes the embodiments of this application in detail based on the foregoing common aspect in the embodiments of this application.

Figure 3:
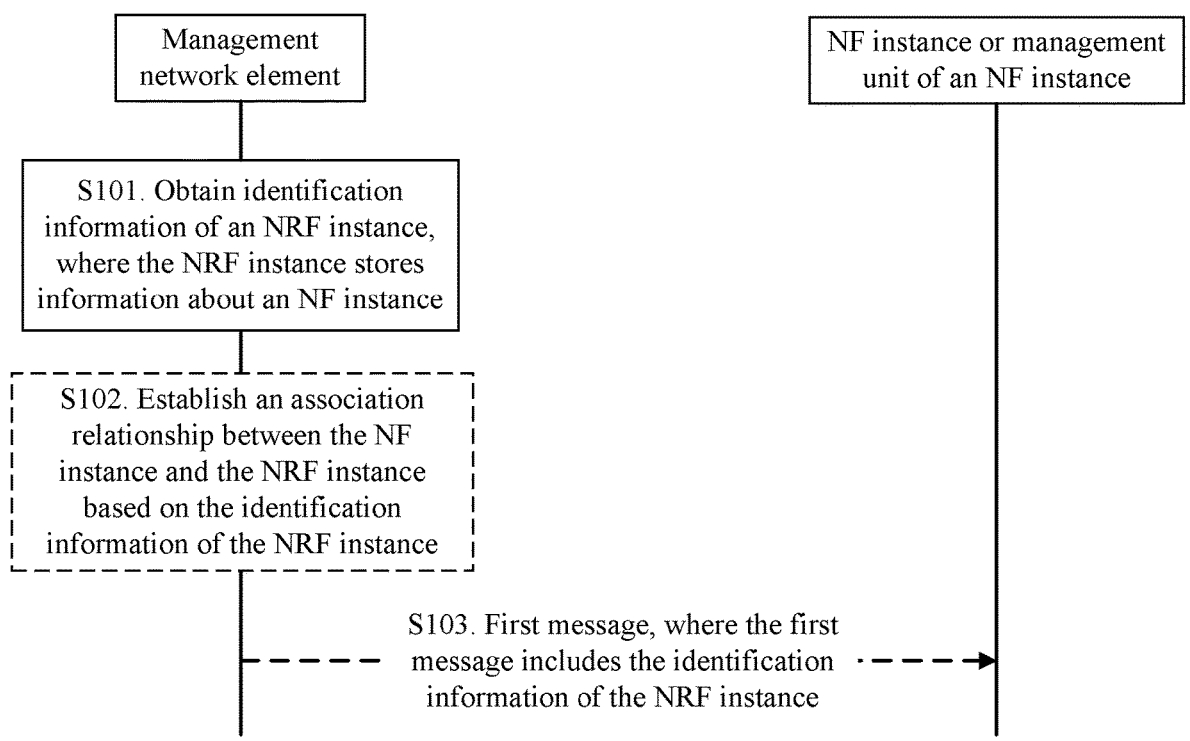
FIG. 3 is a schematic communication diagram of a network function information management method according to an embodiment of this application.

An embodiment of this application provides a network function information management method, and an apparatus and a system that are based on the method. The method includes: obtaining, by a management network element, identification information of an NRF instance, where the NRF instance stores information about an NF instance, and the identification information of the NRF instance is used to indicate the NRF instance associated with the NF instance; and sending, by the management network element, a first message to the NF instance or a management unit of the NF instance, where the first message includes the identification information of the NRF instance; or establishing, by the management network element, an association relationship between the NF instance and the NRF instance based on the identification information of the NRF instance. For example, as shown in FIG. 3, the method may include step S101 and step S102, or may include step S101 and step S103, or may include step S101 to step S103. In this way, when there are a plurality of NRF instances, the management network element can indicate, to the NF instance, the NRF instance associated with the NF instance, or may establish the association relationship between the NF instance and the NRF instance, such that the NF instance registers with the NRF instance, update the information about the NF instance to the NRF instance, or query information about another NF instance from the NRF instance.

In a possible implementation, after receiving the first message, the NF instance may send a second message to the NRF instance, where the second message includes the information about the NF instance, and the second message is used to instruct the NRF instance to store or update the information about the NF instance. Alternatively, the NF instance may send a third message to the NRF instance, where the third message is used to query information about another NF instance from the NRF instance.

In another possible implementation, after receiving the first message, the management unit of the NF instance may send the identification information of the NRF instance to the NF instance. Correspondingly, after receiving the identification information of the NRF instance, the NF instance may send a second message to the NRF instance, where the second message includes the information about the NF instance, and the second message is used to instruct the NRF instance to store or update the information about the NF instance. Alternatively, the NF instance may send a third message to the NRF instance, where the third message is used to query information about another NF instance from the NRF instance.

In the two possible implementations, after receiving the second message, the NRF instance may store or update the information about the NF instance based on the second message. Alternatively, after receiving the third message, the NRF instance may query the information about the other NF instance based on the third message.

Figure 4:
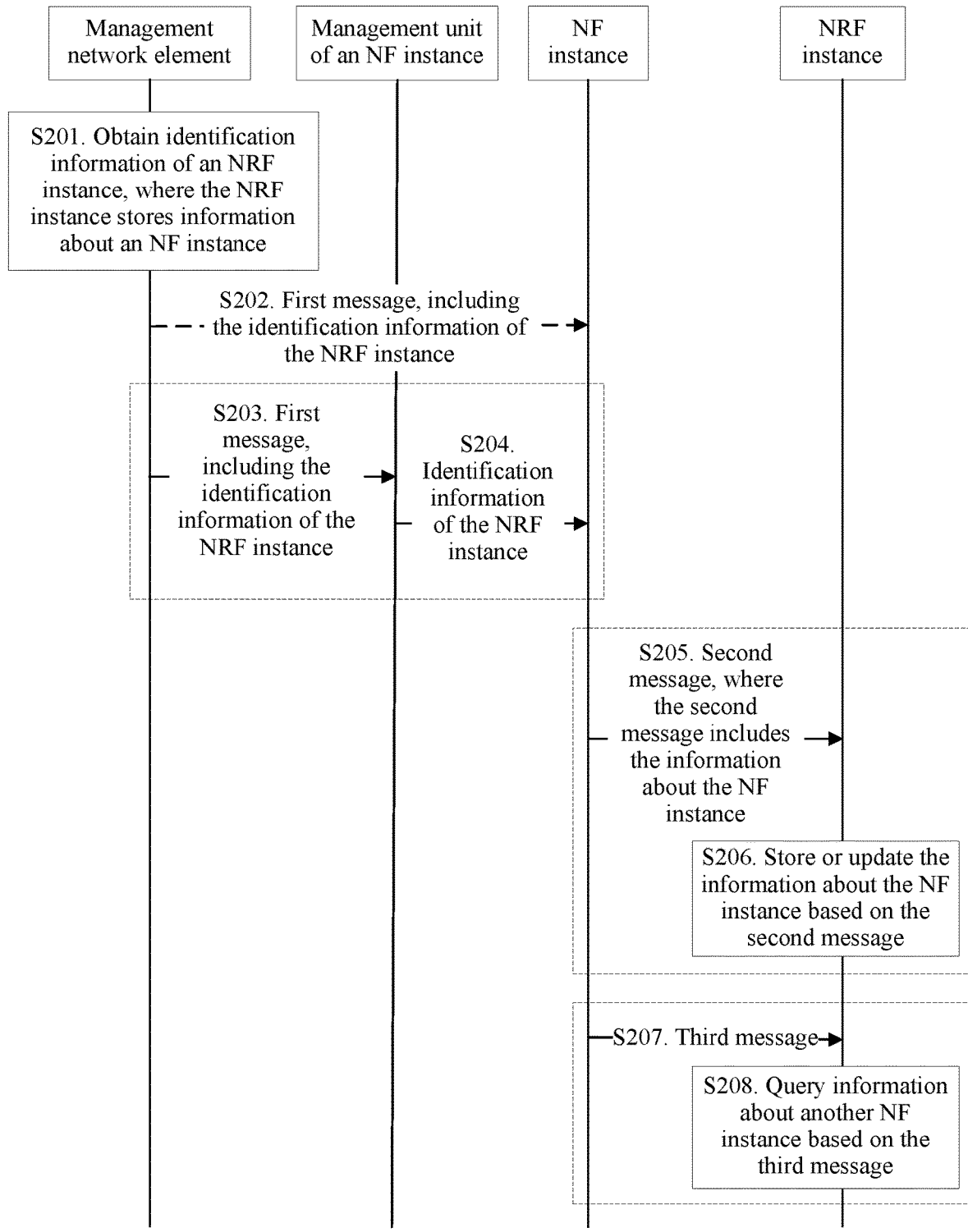
FIG. 4 is a schematic communication diagram of another network function information management method according to an embodiment of this application.

The following describes the solutions provided in the embodiments of this application with reference to FIG. 4.

FIG. 4 is a schematic communication diagram of another network function information management method according to an embodiment of this application. A management unit in FIG. 4 may be an NM unit, a DM unit, an EM unit, or an NF manager unit. The method includes but is not limited to the following steps.

S201. A management network element obtains identification information of an NRF instance, where the NRF instance stores information about an NF instance.

The NRF instance is a network unit configured to store the information about the NF instance. The identification information of the NRF instance is information used to uniquely indicate one NRF instance, and may include at least one of an identifier, a name, or a network address of the NRF instance. In this embodiment of this application, the identification information of the NRF instance may be obtained from another network unit, or may be determined using information stored in the NM unit or the DM unit. This is not limited herein.

In an implementation scenario in which the management network element is an NM unit, a manner for obtaining the identification information of the NRF instance by the NM unit may include receiving a management request message, where the management request message carries the identification information of the NRF instance or indication information of the NRF instance, and the indication information of the NRF instance is used to obtain the identification information of the NRF instance. For example, the management request message may be a creation request message of the NF instance (which may also be referred to as an instantiation request message of an NF), a modification request message of the NF instance, or a configuration request message of the NF instance, or may be a creation request message, an instantiation request message, a modification request message, or a configuration request message of a network slice to which the NF instance belongs or a network slice subnet to which the NF instance belongs. The configuration request message of the NF instance may be a creation request message of a managed object corresponding to the NF instance, or a configuration request message of the managed object corresponding to the NF instance. The configuration request message of the network slice or the network slice subnet may be a creation request message of a managed object corresponding to the network slice or the network slice subnet, or a configuration request message of the managed object corresponding to the network slice or the network slice subnet. Alternatively, a manner for obtaining the identification information of the NRF instance by the NM unit may include obtaining the identification information of the NRF instance or indication information of the NRF instance that is described in a network template, where the indication information of the NRF instance is used to obtain the identification information of the NRF instance. For example, the network template may be a network slice template, a network slice subnet template, or a network function template. It should be noted that a name of the network template is not limited herein, and the network template may also be referred to as a network descriptor, a network blueprint, or the like.

Alternatively, a manner for obtaining the identification information of the NRF instance by the NM unit may include determining the identification information of the NRF instance based on selection information that is of the NRF instance and that is locally preset by the NM unit. For example, NRF instances corresponding to various instance types of NF instances are preset in the selection information of the NRF instance. Therefore, based on a type of a currently configured or created NF instance, an NRF instance corresponding to the NF instance may be determined, and identification information of the NRF instance may be obtained.

The indication information of the NRF instance herein may include at least one piece of isolation requirement information, security information, location information, user information, or network information. To be more specific, the NM unit determines, based on the indication information of the NRF instance, the NRF instance that matches the indication information of the NRF instance, and obtains the identification information of the NRF instance. Alternatively, the NM unit creates a new NRF instance in accordance with the indication information of the NRF instance, and obtains the identification information of the NRF instance.

In an implementation scenario in which the management network element is a DM unit, a manner for obtaining the identification information of the NRF instance by the DM unit may include receiving a management request message sent by an NM unit, where the management request message carries the identification information of the NRF instance. For example, the management request message may be a modification request message of the NF instance or a configuration request message of the NF instance, or may be a creation request message, an instantiation request message, a modification request message, or a configuration request message of a network slice subnet to which the NF instance belongs. The configuration request message of the NF instance may be a creation request message of a managed object corresponding to the NF instance, or a configuration request message of the managed object corresponding to the NF instance. The configuration request message of a network slice or the network slice subnet may be a creation request message of a managed object corresponding to the network slice or the network slice subnet, or a configuration request message of the managed object corresponding to the network slice or the network slice subnet.

Further, after obtaining the identification information of the NRF instance, the management network element may establish an association relationship between the NF instance that needs to be configured currently and the NRF instance, such that when sending a related message, for example, a first message, to the NF instance, the management network element can directly obtain the NRF instance associated with the NF instance. It should be noted that a form of the association relationship is not specifically limited, provided that the form can indicate that the NF instance is associated with the NRF instance. For example, an association relationship list may be set up, and the list includes identification information of the NF instance and the identification information of the NRF instance associated with the NF instance. For another example, the identification information of the NRF instance may be configured in a managed object of the NF instance of the NM unit, to indicate that the NF instance is associated with the NRF instance. The managed object of the NF instance is a log file used to store management information of the NF instance.

Step S202 and steps S203 and S204 are alternative steps to each other. In other words, step S202 may be performed, or steps S203 and S204 may be performed.

S202. The management network element sends a first message to the NF instance, where the first message includes the identification information of the NRF instance.

The first message may be a configuration request message, and carries the identification information of the NRF instance. The identification information of the NRF instance is used to indicate the NRF instance associated with the NF instance. To be more specific, the NRF instance stores the information about the NF instance, and the NF instance queries information about another NF instance from the NRF instance.

Optionally, the first message may further carry the information about the NF instance. The information about the NF instance includes at least one of an instance type, address information, domain name information, slice information of a network slice to which the NF instance belongs, a service area, or a discovery policy.

Optionally, when the first message further carries the information about the NF instance, the management request message may further include the information about the NF instance.

Further, the first message may include registration indication information, and the registration indication information is used to instruct the NF instance whether to register with the NRF instance.

Further, the first message may include access security information, and the access security information is used for access security verification performed by the NRF instance for the NF instance.

S203. The management network element sends a first message to a management unit of the NF instance, where the first message includes the identification information of the NRF instance.

It should be noted that, in this step, for content of the first message, reference may be made to descriptions in step S202. Details are not described herein again.

S204. The management unit of the NF instance sends the identification information of the NRF instance to the NF instance.

For example, after receiving the first message, the management unit of the NF instance may send the first message that includes the identification information of the NRF instance to the NF instance. Alternatively, the management unit of the NF instance may send the identification information of the NRF instance to the NF instance in another manner. For example, the management unit of the NF instance may send the identification information of the NRF instance to the NF instance using another message.

Further, after obtaining the identification information of the NRF instance, the management unit of the NF instance may also establish the association relationship between the NF instance that needs to be configured currently and the NRF instance, such that when sending a related message, for example, a second message, to the NF instance, the management unit of the NF instance can directly obtain the NRF instance associated with the NF instance. It should be noted that a form of the association relationship is not specifically limited, provided that the form can indicate that the NF instance is associated with the NRF instance. For example, an association relationship list may be set up, and the list includes identification information of the NF instance and the identification information of the NRF instance associated with the NF instance. For another example, the identification information of the NRF instance may be configured in a managed object that is of the NF instance and that is maintained by the management network element, to indicate that the NF instance is associated with the NRF instance. The managed object of the NF instance is a log file used to store management information of the NF instance.

Steps S205 and S206 and steps S207 and S208 are alternative steps to each other. In other words, steps S205 and S206 may be performed, or steps S207 and S208 may be performed, or steps S205 and S206 and steps S207 and S208 may be performed. In the last case, an order of steps S205, S206, S207, and S208 is not limited.

S205. The NF instance sends a second message to the NRF instance, where the second message includes the information about the NF instance.

The second message may be a registration request message or an update request message. The second message includes the information about the NF instance, and the second message is used to instruct the NRF instance to store or update the information about the NF instance.

Further, the second message may include the access security information, and the access security information is used for access security verification performed by the NRF instance for the NF instance.

Optionally, when the first message includes registration indication information that is used to instruct registration, the NF instance is triggered to send the registration request message to the NRF instance.

Optionally, before the NF instance sends the second message to the NRF instance, the method further includes receiving, by the NF instance, an activation request message. The activation request message is used to activate the NF instance or a service corresponding to the NF instance, to trigger the NF instance to send the registration request message to the NRF instance.

Further, the method may include sending, by the NF instance, a fourth message to the NRF instance. The fourth message is used to instruct the NRF instance to delete the information about the NF instance or set the information about the NF instance to be unavailable.

Optionally, the fourth message is a deregistration request message of the NF instance or a deregistration request message of the service corresponding to the NF instance, and before the NF instance sends the fourth message to the NRF instance, the method further includes receiving, by the NF instance, a deactivation request message. The deactivation request message is used to deactivate the NF instance or the service corresponding to the NF instance, to trigger the NF instance to send the deregistration request message to the NRF instance.

S206. The NRF instance stores or updates the information about the NF instance based on the second message.

When the second message is the registration request message, the NRF instance stores the information about the NF instance. When the second message is the update request message, the NRF instance updates the information about the NF instance.

In this way, the NF instance can directly register with the NRF instance, or update the information about the NF instance to the NRF instance, thereby reducing a time for configuring network function information, and optimizing a configuration procedure.

S207. The NF instance sends a third message to the NRF instance, where the third message is used to query information about another NF instance from the NRF instance.

The third message may be a query request message. The third message may carry service information that needs to be queried, and is used to query the information about the other NF instance from the NRF instance.

Optionally, before the NF instance sends the third message to the NRF instance, the method may further include sending, by the management network element, a fifth message to the NRF instance. The fifth message includes the information about the NF instance.

Optionally, before the NF instance sends the third message to the NRF instance, the method may further include sending, by a terminal, a service request to the NF instance, to trigger the NF instance to send the third message to the NRF instance based on the service request.

S208. The NRF instance queries the information about the other NF instance based on the third message.

The NRF instance queries, based on the service information in the third message, information about an NF instance that can process a service corresponding to the service information.

In this way, when there are a plurality of NRF instances, the NF instance can learn of the NRF instance associated with the NF instance, and determine to query the information about the other NF instance from the NRF instance.

Figure 5A:
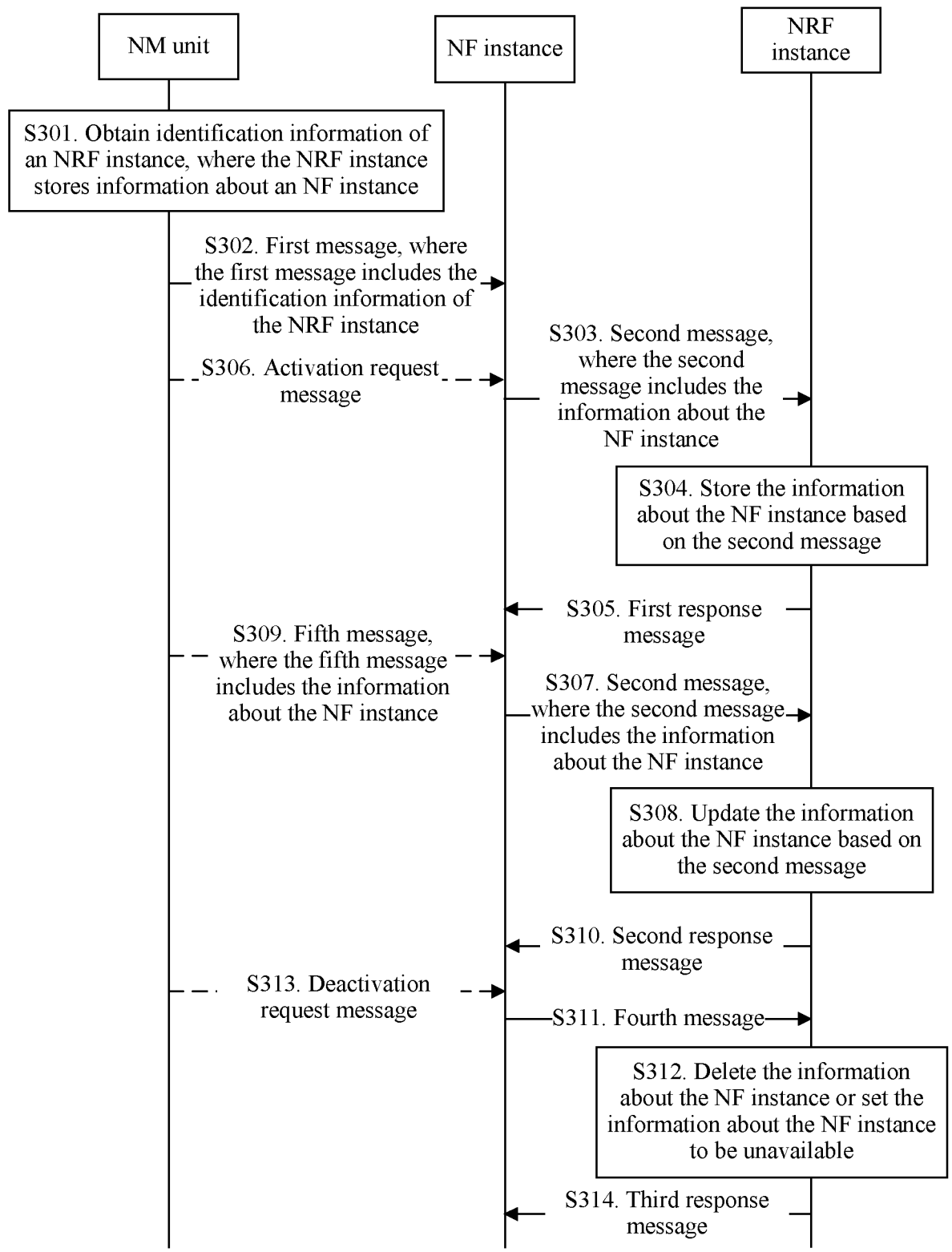
FIG. 5A is a schematic communication diagram of still another network function information management method according to an embodiment of this application.

FIG. 5A is a schematic communication diagram of still another network function information management method according to an embodiment of this application. The solution shown in FIG. 5A is described using an example in which a management network element is an NM unit. The NM unit may directly communicate with an NF instance, and manage a configuration of the NF instance. The method includes but is not limited to the following steps.

S301. The NM unit obtains identification information of an NRF instance, where the NRF instance stores information about the NF instance.

The NRF instance is a network unit configured to store the information about the NF instance. The identification information of the NRF instance is information used to uniquely indicate one NRF instance, and may include at least one of an identifier, a name, or a network address of the NRF instance. In this embodiment of this application, the identification information of the NRF instance may be obtained from another network unit, or may be determined using information stored in the NM unit or a DM unit. This is not limited herein.

The information about the NF instance may include at least one of an instance type, address information, domain name information, slice information of a network slice to which the NF instance belongs, a service area, information about an NF group to which the NF instance belongs, or a discovery policy.

The address information of the NF instance may be an Internet Protocol (IP) address, a port address, or the like. The domain name information of the NF instance may be a fully qualified domain name (FQDN). The fully qualified domain name may represent a logically exact location of a host. In other words, the fully qualified domain name is a complete representation form of a host name. The slice information of the network slice to which the NF instance belongs may include identification information of the network slice or identification information of a network slice subnet, and may further include tenant information, network slice type information, network slice selection assistance information (NSSAI) single-NSSAI (s-NSSAI), or the like of the network slice to which the NF instance belongs. The network slice may also be referred to as a network slice instance, and the network slice subnet may also be referred to as a network slice subnet instance. The service area of the NF instance is information about an area in which the NF instance can provide a service, that is, only a terminal or a network unit in the service area can invoke the service provided by the NF instance. The discovery policy of the NF instance indicates a case in which the NF instance can be discovered and invoked by another terminal or network unit. For example, when load of the NF instance exceeds 80%, the NF instance cannot be invoked by another terminal or network unit to provide a service. The information about the NF group to which the NF instance belongs is used to identify a set that includes NF instances of a same type and to which the NF instance belongs. The instance type of the NF instance may be any one of the following: an authentication server function (AUSF); an access and mobility management function (AMF); a data network (DN) function, for example, operator services and internet access or third party services; a structured data storage network function (SDSF); an unstructured data storage network function (UDSF); a network exposure function (NEF); a network repository function (NRF), which may also be represented as a network function repository function; a policy control function (PCF); a session management function (SMF); unified data management (UDM); a user plane function (UPF); an application function (AF); a next-generation NodeB function (gNBF) or a 5G NodeB function; an evolved NodeB function (eNBF); an evolved LTE evolved NodeB function (eLTE eNBF); or a NodeB function (NBF).

In a first possible implementation scenario, if the NM unit determines to configure an NF instance, the NM unit may create an NRF instance or select an NRF instance from existing NRF instances as the NRF instance that stores information about the NF instance, and obtain identification information of the NRF instance.

In the implementation scenario, there may be the following manners for obtaining the identification information of the NRF instance by the NM unit.

In a first possible case, the NM unit receives a management request message. The management request message carries the identification information of the NRF instance. The management request message herein may be a creation request message of the NF instance (which may also be referred to as an instantiation request message of an NF), a modification request message of the NF instance, or a configuration request message of the NF instance. When receiving the configuration request message of the NF instance or the modification request message of the NF instance, the NM unit may determine the NF instance that needs to be configured, and obtain the identification information of the NRF instance associated with the NF instance. In other words, the management request message carries the identification information of the NRF instance. When receiving the creation request message of the NF instance, the NM unit may create the NF instance, and obtain the identification information of the NRF instance associated with the NF instance. In other words, the management request message carries the identification information of the NRF instance.

In a second possible case, the NM unit receives a management request message. The management request message carries indication information of the NRF instance. The indication information of the NRF instance herein may include at least one piece of isolation requirement information, security information, location information, user information, and network information. The isolation requirement information is an isolation requirement of the NRF instance or an isolation requirement (for example, complete isolation, hard isolation, or soft isolation) of a network to which the NRF instance belongs. The security information is security-related information, for example, a security level, of the NRF instance or the network to which the NRF instance belongs. The location information is a deployment location of the NF instance. The user information is information of a user who rents the NF instance or rents a service provided by the NF instance. The network information is requirement information, for example, a bandwidth or latency, of a network to which the NF instance belongs. The management request message may be a creation request message of the NF instance (which may also be referred to as an instantiation request message of an NF), a modification request message of the NF instance, or a configuration request message of the NF instance.

The NM unit may create, based on the indication information of the NRF instance, the NRF instance in accordance with the indication information, or determine, from existing NRF instances, the NRF instance that matches the indication information. When receiving the configuration request message of the NF instance or the modification request message of the NF instance, the NM unit may determine the NF instance that needs to be configured, and determine and obtain, based on the indication information, the identification information of the NRF instance associated with the NF instance. When receiving the creation request message of the NF instance, the NM unit may create the NF instance, and determine and obtain, based on the indication information, the identification information of the NRF instance associated with the NF instance.

For example, if the indication information of the NRF instance is the isolation requirement information, the NM unit may select different NRF instances from existing NRF instances based on different isolation requirement information. For example, an NRF instance with good isolation is selected for a high isolation requirement; and an NRF instance with poor isolation is selected for a low isolation requirement. Alternatively, the NM unit may determine, based on different isolation requirement information, to create an NRF instance or reuse an existing NRF instance. For example, a new NRF instance is created for a high isolation requirement, and an existing NRF instance that is being used is reused for a low isolation requirement.

A manner for determining an NRF instance based on the security information is similar to a manner for determining an NRF instance based on the isolation requirement information. To be more specific, an NRF instance with high security performance is selected for a high security level, and an NRF instance with low security performance is selected for a low security level. Alternatively, a new NRF instance is created for a high security level, and an existing NRF instance that is being used is reused for a low security level.

If the indication information of the NRF instance is the location information, the NM unit may select or create, based on the deployment location of the NF instance, an NRF instance near the NF instance.

If the indication information of the NRF instance is the user information, the NM unit may store information about all NF instances serving one user into one NRF instance based on the user information, or may select, based on a user priority/level indicated by the user information, an NRF instance with high performance for a user with a high user priority/level and an NRF instance with low performance for a user with a low user priority/level.

If the indication information of the NRF instance is the network information, the NM unit may select or create, based on different network information, an NRF instance that can match the network information.

It should be noted that, the NM unit may comprehensively select or create a proper NRF instance based on indication information of the foregoing plurality of NRF instances.

In a third possible case, the NM unit obtains the identification information of the NRF instance in a network template. The network template describes a type or deployment information of a type of network, and is used to create or instantiate a network slice, a network slice subnet, or an NF instance. The network template may be a network slice template, a network slice subnet template, or a network function template. The NM unit may pre-store the network template, and obtain, from the network template when determining to configure an NF instance, identification information of an NRF instance corresponding to the NF instance.

In a fourth possible case, the NM unit obtains indication information of the NRF instance in a network template. Similar to the second possible case, the NM unit may create, based on the indication information of the NRF instance, the NRF instance in accordance with the indication information, or determine, in existing NRF instances, the NRF instance that matches the indication information.

In a fifth possible case, the NM unit may determine the identification information of the NRF instance based on selection information that is of the NRF instance and that is locally preset by the NM unit. For example, NRF instances corresponding to various instance types of NF instances are preset in the selection information of the NRF instance. Therefore, based on a type of a currently configured or created NF instance, an NRF instance corresponding to the NF instance may be determined, and identification information of the NRF instance may be obtained.

In a second possible implementation scenario, if the NM unit determines to create a network slice or a network slice subnet, where the network slice or the network slice subnet includes at least one NF instance, the NM unit creates a new NRF instance for the at least one NF instance in the network slice or the network slice subnet, or selects an NRF instance from existing NRF instances as an NRF instance that stores information about the at least one NF instance. It should be noted that the information about the at least one NF instance herein may be all stored by one NRF instance, or may be separately stored by a plurality of NRF instances. This is not specifically limited herein.

Similarly, in the implementation scenario, there may also be the following manners for obtaining the identification information of the NRF instance by the NM unit.

In a first possible case, the NM unit receives a management request message. The management request message carries the identification information of the NRF instance. The management request message herein may be a creation request message, an instantiation request message, a modification request message, or a configuration request message of a network slice. The NM unit may create or configure the network slice based on the creation request message, the instantiation request message, the modification request message, or the configuration request message of the network slice, where the network slice includes at least one NF instance, and obtain identification information of an NRF instance associated with the at least one NF instance. In other words, the management request message carries the identification information of the NRF instance.

In a second possible case, the NM unit receives a management request message. The management request message carries indication information of the NRF instance. The NM unit may create, based on the indication information of the NRF instance, the NRF instance in accordance with the indication information, or determine, in existing NRF instances, the NRF instance that matches the indication information. The management request message may be a creation request message, an instantiation request message, a modification request message, or a configuration request message of a network slice. When receiving the creation request message, the instantiation request message, the modification request message, or the configuration request message of the network slice, the NM unit creates or configures the network slice, where the network slice includes at least one NF instance, and determines and obtains, based on the indication information, identification information of an NRF instance associated with the at least one NF instance. For a method, refer to the second possible case in the first possible implementation scenario.

A third to a fifth possible case are similar to the third to the fifth possible cases in the first possible implementation scenario. Details are not described herein again.

Further, after obtaining the identification information of the NRF instance, the NM unit may establish an association relationship between the NF instance that currently needs to be configured and the NRF instance, such that when sending a related message, for example, a first message, to the NF instance, the NM unit can directly obtain the NRF instance associated with the NF instance. It should be noted that a form of the association relationship is not specifically limited, provided that the form can indicate that the NF instance is associated with the NRF instance. For example, an association relationship list may be set up, and the list includes identification information of the NF instance and the identification information of the NRF instance associated with the NF instance. For another example, the identification information of the NRF instance may be configured in a managed object that is of the NF instance and that is maintained by the NM unit, to indicate that the NF instance is associated with the NRF instance. The managed object of the NF instance is a log file used to store management information of the NF instance.

S302. The NM unit sends a first message to the NF instance, where the first message includes the identification information of the NRF instance.

The first message includes the identification information of the NRF instance, and the identification information of the NRF instance is used to indicate the NRF instance associated with the NF instance. To be more specific, the NRF instance stores and maintains the information about the NF instance, and the NF instance may perform operations, for example, registering with the NRF instance and querying from the NRF instance. The first message may be a configuration request message. Optionally, the first message may further include the information about the NF instance, and the information about the NF instance may be carried in the management request message.

The first message may further include registration indication information, and the registration indication information is used to instruct the NF instance whether to register with the NRF instance. In a possible implementation scenario, the first message carries the registration indication information, instructing the NF instance to register with the NRF instance. Alternatively, the first message does not carry the registration indication information, instructing the NF instance not to register with the NRF instance. In another possible implementation scenario, the first message definitely carries the registration indication information, and the registration indication information may be a bit that can represent two indication states. For example, when the bit is set to 1, the NF instance is instructed to register with the NRF instance, or when the bit is set to 0, the NF instance is instructed not to register with the NRF instance. In still another possible implementation scenario, if the first message does not carry the registration indication information, it is determined by default that the NF instance registers with the NRF instance. Alternatively, if the first message carries the registration indication information, whether the NF instance registers with the NRF instance is determined based on an indication of the registration indication information.

In this way, the NM unit can control whether the NF instance registers with the NRF instance, to avoid management inconvenience caused because the NM instance cannot monitor a registration status of the NF instance.

Further, optionally, the first message may include access security information, and the access security information is used for access security verification performed by the NRF instance for the NF instance. The access security information may be considered as a key for the NF instance to register with the NRF instance. The NRF instance registers the information about the NF instance only when the NRF instance succeeds in verifying the access security information sent by the NF instance, thereby avoiding unauthorized access form another network unit.

Further, in an implementation scenario in which the NM unit sends the first message to the NF instance using a management unit (for example, EM or NFM) of the NF instance, after obtaining the identification information of the NRF instance, the management unit of the NF instance may also establish the association relationship between the NF instance that needs to be configured currently and the NRF instance, such that when sending a related message, for example, a second message, to the NF instance, the management unit of the NF instance can directly obtain the NRF instance associated with the NF instance.

It should be noted that a form of the association relationship is not specifically limited, provided that the form can indicate that the NF instance is associated with the NRF instance. For example, an association relationship list may be set up, and the list includes identification information of the NF instance and the identification information of the NRF instance associated with the NF instance. For another example, the identification information of the NRF instance may be configured in a managed object that is of the NF instance and that is maintained by the NM unit, to indicate that the NF instance is associated with the NRF instance. The managed object of the NF instance is a log file used to store management information of the NF instance.

S303. The NF instance sends a second message to the NRF instance, where the second message includes the information about the NF instance.

In this step, the second message may be a registration request message used to instruct the NRF instance to store the information about the NF instance. Further, when the first message includes the information about the NF instance, the information about the NF instance included in the second message may be received from the first message. Alternatively, when the first message does not include the information about the NF instance, the information about the NF instance included in the second message may be queried by the NF instance.

S304. The NRF instance stores the information about the NF instance based on the second message.

In this way, the NF instance can directly register with the NRF instance, or update the information about the NF instance to the NRF instance, thereby reducing a time for configuring network function information, and optimizing a configuration procedure.

Further, S305 may be included after S304.

S305. The NRF instance sends a first response message to the NF instance.

The first response message may be a registration request response message used to indicate that the NRF instance completes storing the information about the NF instance.

Optionally, S306 may be further performed before S303.

S306. The NM unit sends an activation request message to the NF instance.

The activation request message is used to activate the NF instance or a service corresponding to the NF instance, to trigger the NF instance to perform S203, that is, sending the registration request message to the NRF instance. It may be considered that, in this case, the NF instance or the service corresponding to the NF instance has not been activated for use before, and the NF instance or the service corresponding to the NF instance is activated only when the NM unit sends the activation request message to the NF instance, and can initiate registration to the NRF instance.

It should be noted that, the NF instance may be a logical entity that provides a related network service, and the activation request message may be directly used to activate the NF instance, or activate a corresponding service provided by the NF instance.

In this way, the NF instance registers with the NRF instance only when the NF instance is in an active state, to avoid a service provisioning failure caused because the NRF instance directs a route to an inactive NF instance during a service query.

Further, when the information about the NF instance needs to be updated, S307 and S308 may be performed after S304 or S305.

S307. The NF instance sends a second message to the NRF instance, where the second message includes the information about the NF instance.

When the information about the NF instance that is obtained by the NF instance or obtained in another manner needs to be updated, the NF instance may send the second message to the NRF instance. In this step, the second message may be a first update request message, and used to instruct the NRF instance to update the information about the NF instance. In the implementation scenario, the information about the NF instance is update information of the NF instance, and the update information may be updated complete information about the NF instance, or may be differentiated information for the information about the NF instance (for example, the information about the NF instance stored in S304) currently stored in the NRF instance. This is not specifically limited herein.

For example, if the NF instance updates the slice information of the network slice to which the NF instance belongs, the information about the NF instance may be complete information about the NF instance, including updated slice information and other information such as the instance type, the address information, the domain name information, the service area, or the discovery policy. Alternatively, the information about the NF instance may include only the updated slice information, namely, the differentiated information.

S308. The NRF instance updates the information about the NF instance based on the second message.

Optionally, S309 may be further performed before S307.

S309. The NM unit sends a fifth message to the NF instance, where the fifth message includes the information about the NF instance.

When determining that the information about the NF instance needs to be updated, the NM unit may send the fifth message to the NF instance. The fifth message may be a second update request message, and used to instruct the NF instance to update information to the NRF unit. Consistent with S307, the information about the NF instance herein is also update information of the NF instance, and the update information may be updated complete information about the NF instance, or may be differentiated information for the information about the NF instance (for example, the information about the NF instance stored in S304) currently stored in the NRF instance. This is not specifically limited herein.

Further, S310 may be performed after S308.

S310. The NRF instance sends a second response message to the NF instance.

The second response message may be an update request response message, and used to indicate that the NRF instance completes updating the information about the NF instance.

Optionally, S311 and S312 may be further performed after S304 or S305.

S311. The NF instance sends a fourth message to the NRF instance.

The fourth message is used to instruct the NRF instance to delete the information about the NF instance or set the information about the NF instance to be unavailable. For example, the fourth message may be a deregistration request message, a deletion request message, or the like. This is not specifically limited herein.

S312. The NRF instance deletes the information about the NF instance or sets the information about the NF instance to be unavailable.

After the NRF instance deletes the information about the NF instance or sets the information about the NF instance to be unavailable, the NRF instance no longer directs a route to the NF instance during a subsequent service query.

Optionally, S313 may be further performed before S311.

S313. The NM unit sends a deactivation request message to the NF instance.

In the implementation scenario, the deactivation request message is used to deactivate the NF instance or the service corresponding to the NF instance, to trigger the NF instance to perform S308, that is, sending the fourth message to the NRF instance. It may be considered that, in this case, the NF instance or the service corresponding to the NF instance has been activated for use before, and when the NM unit sends the deactivation request message to the NF instance, the NF instance or the service corresponding to the NF instance is deactivated, and therefore sends the fourth message to the NRF instance.

In this way, the NF in an inactive state triggers the NRF instance to delete the information about the NF instance or set the information about the NF instance to be unavailable, to avoid finding a faulty NF instance or an unavailable NF instance.

Further, S314 may be included after S312.

S314. The NRF instance sends a third response message to the NF instance.

The third response message may be a deregistration request response message or a deletion request response message, and is used to indicate that the NRF instance completes the operation of deleting the information about the NF instance or setting the information about the NF instance to be unavailable.

Figure 5B:
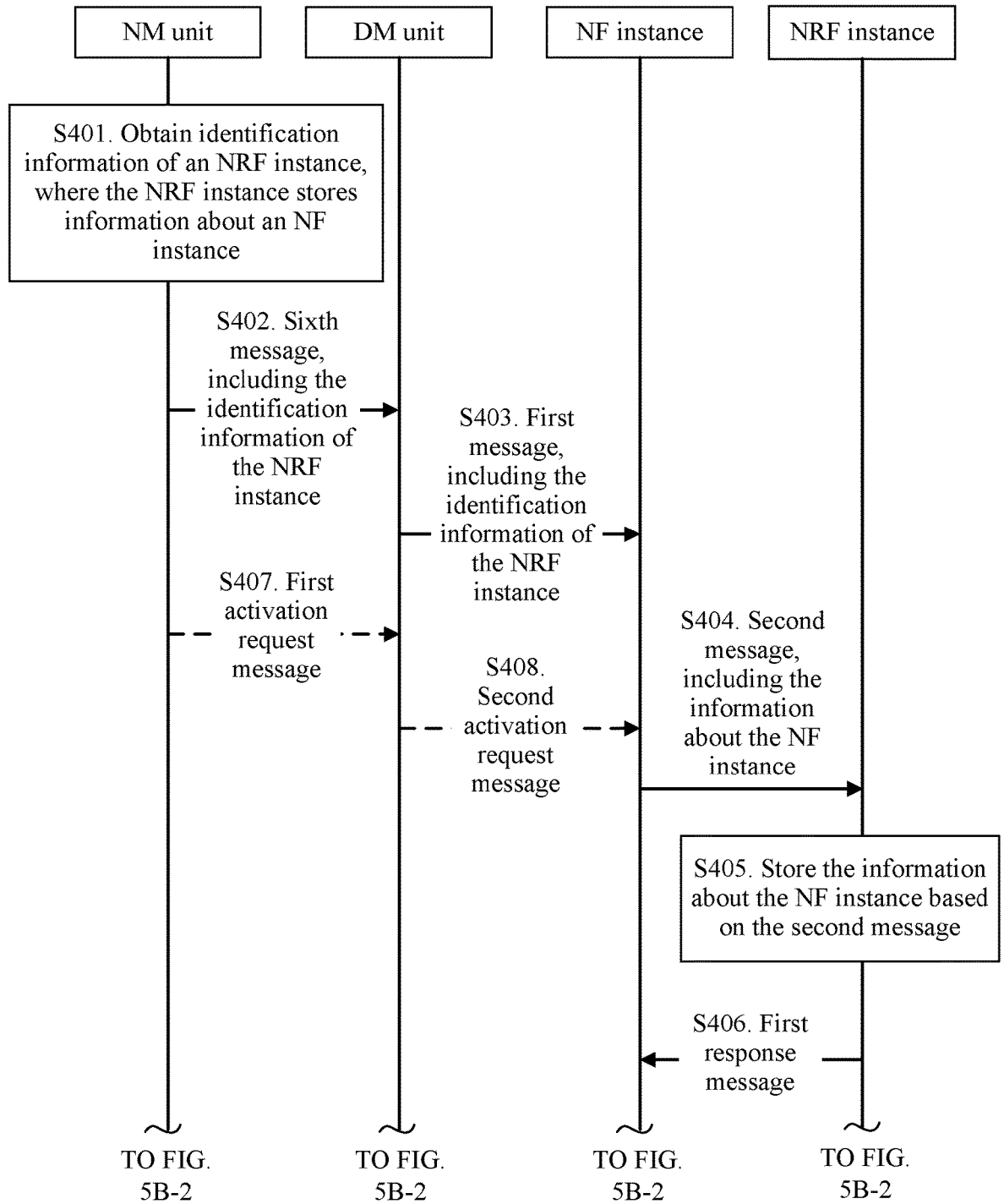
FIG. 5B and FIG. 5C are schematic communication diagrams of still another network function information management method according to an embodiment of this application.
Figure 5C:
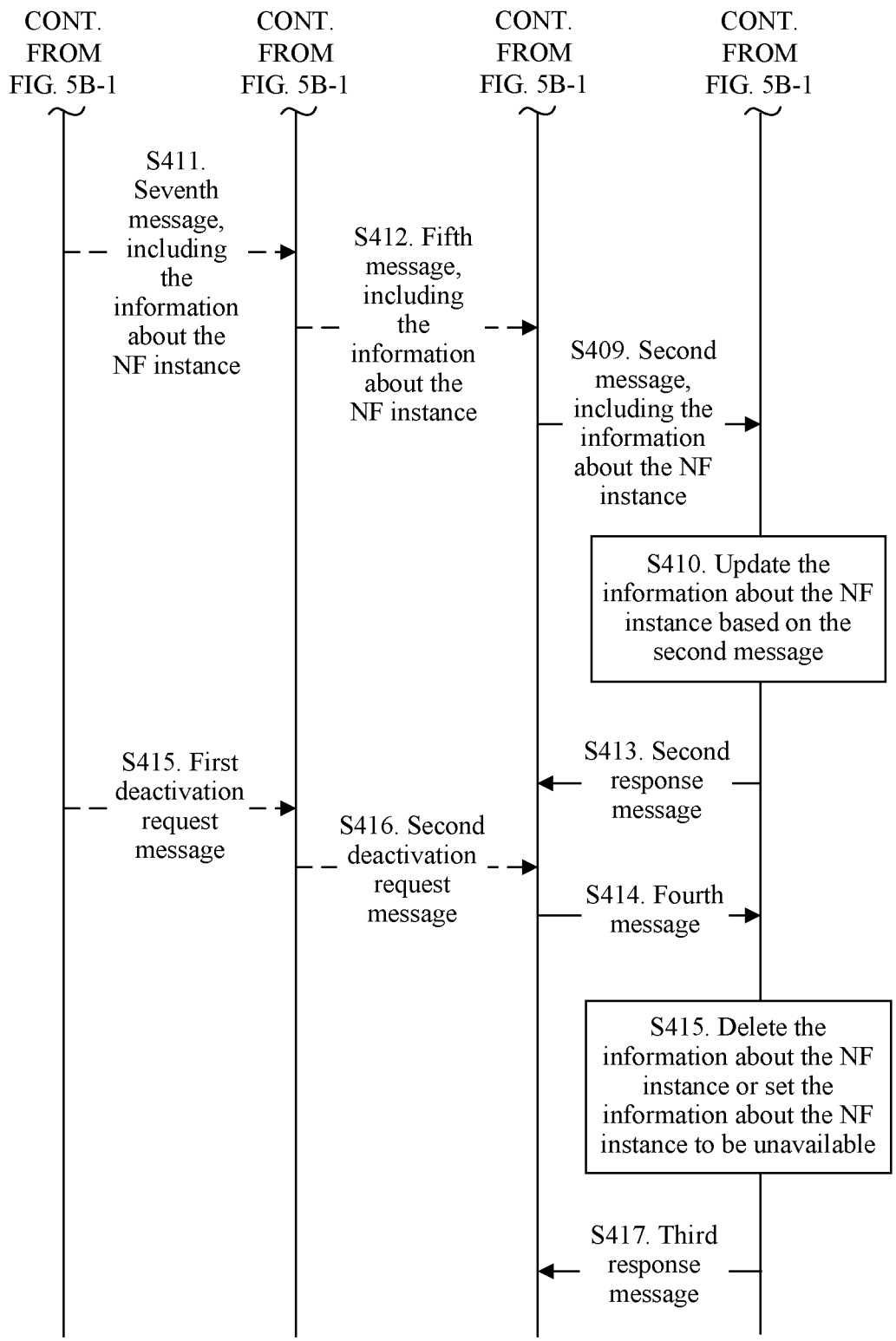

FIG. 5B and FIG. 5C are a communication schematic diagram of still another network function information management method according to an embodiment of this application. The solution in FIG. 5B and FIG. 5C is described using an example in which a management network element is an NM unit. The NM unit communicates with an NF instance using a DM unit, and manages a configuration of the NF instance. The method includes but is not limited to the following steps.

S401. The NM unit obtains identification information of an NRF instance, where the NRF instance stores information about the NF instance.

For an implementation of S401, refer to S301. Details are not described herein again.

S402. The NM unit sends a sixth message to the DM unit, where the sixth message includes the identification information of the NRF instance.

The sixth message includes the identification information of the NRF instance, and may be a modification request message of the NF instance or a configuration request message of the NF instance, or may be a creation request message, an instantiation request message, a modification request message, or a configuration request message of a network slice subnet. For example, the configuration request message of the NF instance may be a creation request message of a managed object corresponding to the NF instance, or a configuration request message of the managed object corresponding to the NF instance. The configuration request message of a network slice or the network slice subnet may be a creation request message of a managed object corresponding to the network slice or the network slice subnet, or a configuration request message of the managed object corresponding to the network slice or the network slice subnet.

In a first possible implementation scenario, if the NM unit determines to configure an NF instance, the sixth message is the modification request message of the NF instance or the configuration request message of the NF instance. The sixth message may carry the identification information of the NRF instance and identification information of the NF instance, and be used to instruct the DM unit to send a first message to the NF instance, to establish an association between the NF instance and the NRF instance. For example, the configuration request message of the NF instance may be the creation request message of the managed object corresponding to the NF instance, or the configuration request message of the managed object corresponding to the NF instance.

In another possible implementation scenario, if the NM unit determines to create a network slice or a network slice subnet, the sixth message is the creation request message, the instantiation request message, the modification request message, or the configuration request message of the network slice subnet. The sixth message may carry the identification information of the NRF instance and identification information (for example, a network slice subnet identifier (NSSI)) of the network slice subnet created by the NM unit, and be used to instruct the DM unit to create or configure at least one NF instance included in the network slice subnet, and send a first message to the at least one NF instance to establish an association between the NF instance and the NRF instance. For example, the configuration request message of the network slice or the network slice subnet may be the creation request message of the managed object corresponding to the network slice or the network slice subnet, or the configuration request message of the managed object corresponding to the network slice or the network slice subnet.

Further, after obtaining the identification information of the NRF instance, the NM unit or the DM unit may establish an association relationship between the NF instance that needs to be configured currently and the NRF instance, such that when sending a related message, for example, the first message, to the NF instance, the NM unit or the DM unit can directly obtain the NRF instance associated with the NF instance. It should be noted that a form of the association relationship is not specifically limited, provided that the form can indicate that the NF instance is associated with the NRF instance. For example, an association relationship list may be set up, and the list includes identification information of the NF instance and the identification information of the NRF instance associated with the NF instance. For another example, the identification information of the NRF instance may be configured in a managed object that is of the NF instance and that is maintained by the NM unit, to indicate that the NF instance is associated with the NRF instance. The managed object of the NF instance is a log file used to store management information of the NF instance.

S403. The DM unit sends a first message to the NF instance, where the first message includes the identification information of the NRF instance.

Further, in an implementation scenario in which the DM unit sends the first message to the NF instance using a management unit (for example, NFM) of the NF instance, after obtaining the identification information of the NRF instance, the management unit of the NF instance may also establish the association relationship between the NF instance that needs to be configured currently and the NRF instance, such that when sending a related message, for example, a second message, to the NF instance, the management unit of the NF instance can directly obtain the NRF instance associated with the NF instance.

It should be noted that a form of the association relationship is not specifically limited, provided that the form can indicate that the NF instance is associated with the NRF instance. For example, an association relationship list may be set up, and the list includes identification information of the NF instance and the identification information of the NRF instance associated with the NF instance. For another example, the identification information of the NRF instance may be configured in a managed object that is of the NF instance and that is maintained by the DM unit, to indicate that the NF instance is associated with the NRF instance. The managed object of the NF instance is a log file used to store management information of the NF instance.

For an implementation of S403, refer to S302. Details are not described herein again.

S404. The NF instance sends a second message to the NRF instance, where the second message includes the information about the NF instance.

For an implementation of S404, refer to S303. Details are not described herein again.

S405. The NRF instance stores the information about the NF instance based on the second message.

Further, S406 may be included after S405.

S406. The NRF instance sends a first response message to the NF instance.

For an implementation of S406, refer to S305. Details are not described herein again.

Optionally, S407 and S408 are further included before S404.

S407. The NM unit sends a first activation request message to the DM unit.

The first activation request message may carry the identification information of the NF instance, or may carry the identification information of the network slice subnet. For example, when the NM unit activates the NF instance or a service corresponding to the NF instance, the first activation request message may carry the identification information of the NF instance. When the NM unit activates the at least one NF instance or a service corresponding to the at least one NF instance included in the network slice subnet, the first activation request message may carry the identification information of the network slice subnet.

S408. The DM unit sends a second activation request message to the NF instance based on the first activation request message.

The DM unit determines the corresponding NF instance based on the identification information of the NF instance or the identification information of the network slice subnet carried in the first activation request message, and sends the second activation request message to the NF instance. The second activation request message is used to activate the NF instance or the service corresponding to the NF instance, to trigger the NF instance to send a registration request message to the NRF instance. For an implementation of S408, refer to S306. Details are not described herein again.

Further, when the information about the NF instance needs to be updated, S409 and S410 may be performed after S405 or S406.

S409. The NF instance sends a second message to the NRF instance, where the second message includes the information about the NF instance.

S410. The NRF instance updates the information about the NF instance based on the second message.

For implementations of S409 and S410, refer to S307 and S308. Details are not described herein again.

Optionally, S411 and S412 may be further performed before S409.

S411. The NM unit sends a seventh message to the DM unit, where the seventh message includes the information about the NF instance.

When determining that the information about the NF instance needs to be updated, the NM unit may send the seventh message to the DM instance. The seventh message may be a third update request message, and used to instruct the DM unit to send a fifth message to the NF instance, to trigger the NF instance to update information to the NRF instance.

S412. The DM unit sends the fifth message to the NF instance, where the fifth message includes the information about the NF instance.

For an implementation of S412, refer to S309. Details are not described herein again.

Further, S413 may be performed after S410.

S413. The NRF instance sends a second response message to the NF instance.

For an implementation of S413, refer to S310. Details are not described herein again.

Optionally, S414 and S415 may be further performed after S405 or S406.

S414. The NF instance sends a fourth message to the NRF instance.

S415. The NRF instance deletes the information about the NF instance or sets the information about the NF instance to be unavailable.

For implementations of S414 and S415, refer to S311 and S312. Details are not described herein again.

Optionally, S415 and S416 may be further performed before S414.

S415. The NM unit sends a first deactivation request message to the DM unit.

The first deactivation request message may carry the identification information of the NF instance, or may carry the identification information of the network slice subnet. For example, when the NM unit deactivates the NF instance or the service corresponding to the NF instance, the first activation request message may carry the identification information of the NF instance. When the NM unit deactivates the at least one NF instance or the service corresponding to the at least one NF instance included in the network slice subnet, the first activation request message may carry the identification information of the network slice subnet.

S416. The DM unit sends a second deactivation request message to the NF instance.

The DM unit determines the corresponding NF instance based on the identification information of the NF instance or the identification information of the network slice subnet carried in the first deactivation request message, and sends the second deactivation request message to the NF instance. The second deactivation request message is used to deactivate the NF instance or the service corresponding to the NF instance, to trigger the NF instance to send the fourth message to the NRF instance. For an implementation of S416, refer to S313. Details are not described herein again.

Further, S417 may be included after S415.

S417. The NRF instance sends a third response message to the NF instance.

For an implementation of S417, refer to S314. Details are not described herein again.

Figure 6A:
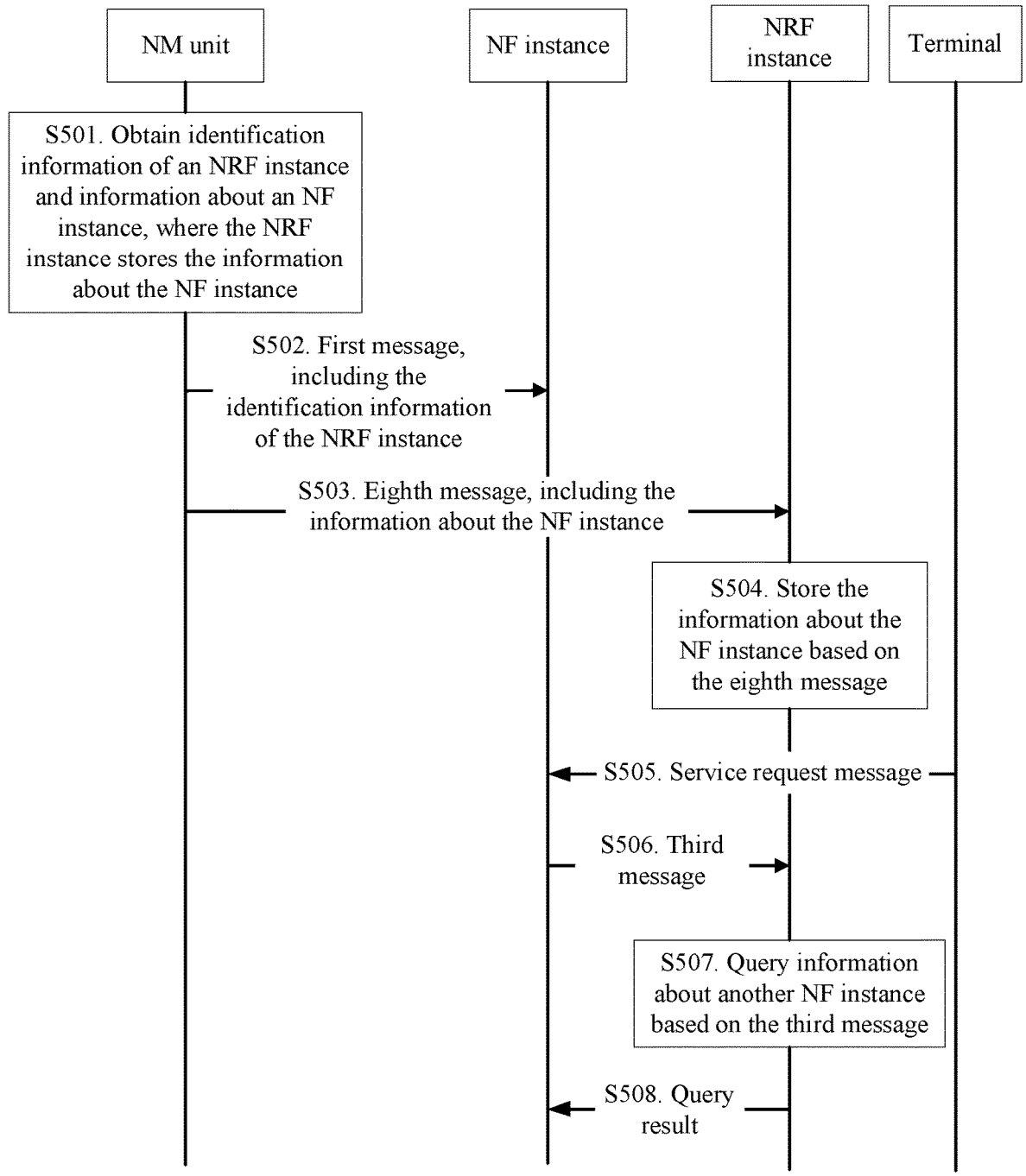
FIG. 6A is a schematic communication diagram of still another network function information management method according to an embodiment of this application.

FIG. 6A is a schematic communication diagram of still another network function information management method according to an embodiment of this application. The solution shown in FIG. 6A is described using an example in which a management network element is an NM unit. The NM unit may directly communicate with an NF instance, and manage a configuration of the NF instance. The method includes but is not limited to the following steps.

S501. The NM unit obtains identification information of an NRF instance and information about the NF instance, where the NRF instance stores the information about the NF instance.

For a method for obtaining, by the NM unit, the identification information of the NRF instance in S501, refer to S201. Details are not described herein again. The information about the NF instance may be carried in a received management request message.

S502. The NM unit sends a first message to the NF instance, where the first message includes the identification information of the NRF instance.

The first message includes the identification information of the NRF instance, and the identification information of the NRF instance is used to indicate the NRF instance associated with the NF instance. To be more specific, the NRF instance stores and maintains the information about the NF instance, and the NF instance may perform operations, for example, registering with the NRF instance and querying from the NRF instance. The first message may be a second configuration request message.

In this way, when there are a plurality of NRF instances, the NM unit can indicate, to the NF instance, the NRF instance associated with the NF instance.

S503. The NM unit sends an eighth message to the NRF instance, where the eighth message includes the information about the NF instance.

The eighth message may be a third configuration request message, include the information about the NF instance, and be used to instruct the NRF to store the information about the NF instance.

S504. The NRF instance stores the information about the NF instance based on the eighth message.

S505. A terminal sends a service request message to the NF instance.

The service request message is used to request one or more network services from the NF instance. The current NF instance cannot provide all network services requested by the terminal, and therefore, the terminal needs to query, from the NRF, another NF instance that can provide a service requested by the terminal.

S506. The NF instance sends a third message to the NRF instance based on the service request message.

The third message may be an NF instance query request message, and used to query, from the NRF instance, information about another NF instance based on the service request message. The third message may carry information about a service requested in the service request message.

S507. The NRF instance queries the information about the other NF instance based on the third message.

The NRF instance queries, based on the third message, stored information about at least one NF instance for the information about the other NF instance that can provide a service requested in the third message.

S508. The NRF instance sends a query result to the NF instance.

If the NRF instance queries the information about the other NF instance that can provide the service requested in the third message, the NRF instance may send information such as a network address of the NF instance to the NF instance, such that the NF instance routes the service request message to the other NF instance.

Figure 6B:
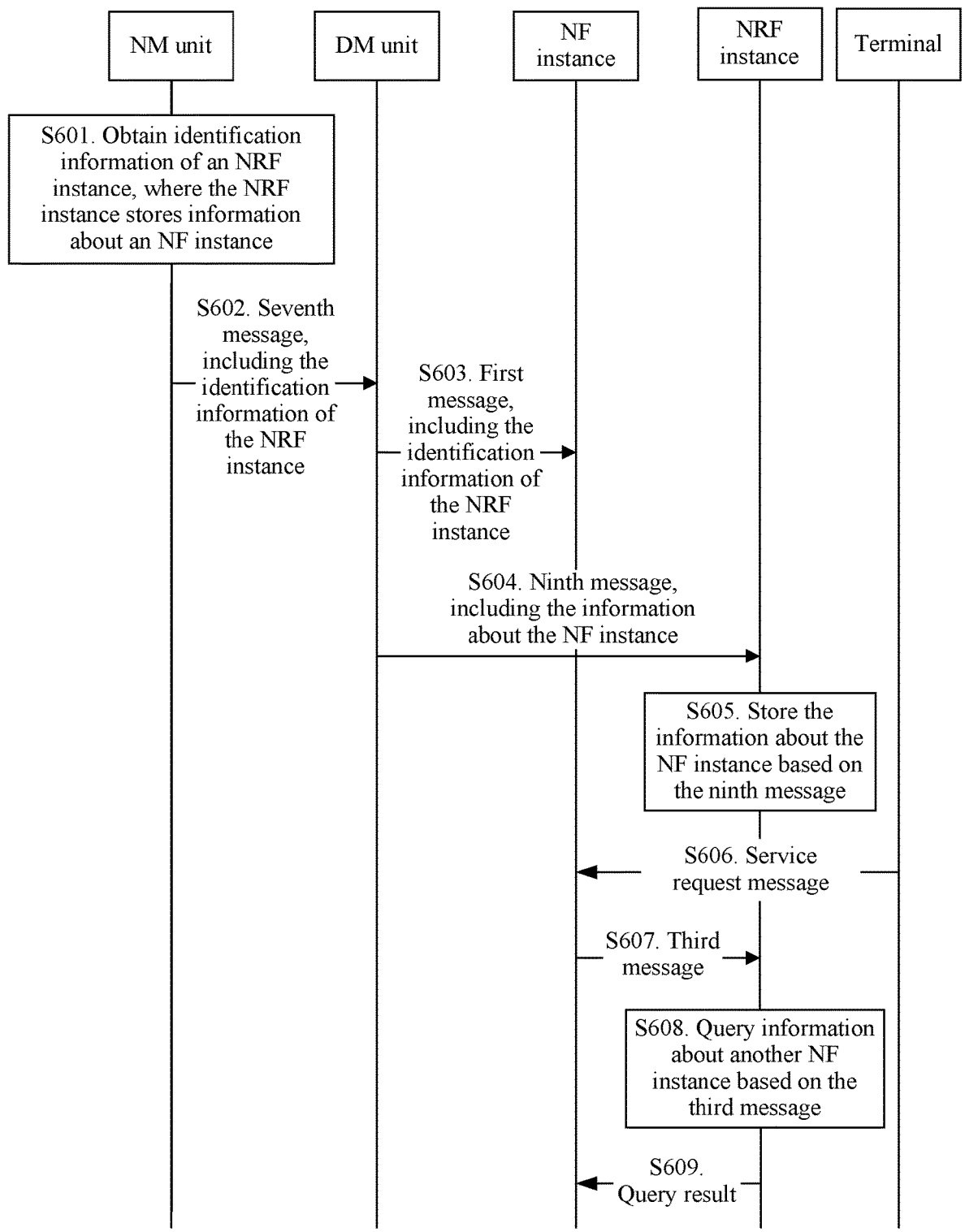
FIG. 6B is a schematic communication diagram of still another network function information management method according to an embodiment of this application.

FIG. 6B is a schematic communication diagram of still another network function information management method according to an embodiment of this application. The solution shown in FIG. 6B is described using an example in which a management network element is an NM unit. The NM unit communicates with an NF instance using a DM unit, and manages a configuration of the NF instance. The method includes but is not limited to the following steps.

S601. The NM unit obtains identification information of an NRF instance, where the NRF instance stores information about the NF instance.

For an implementation of S601, refer to S201. Details are not described herein again.

S602. The NM unit sends a seventh message to the DM unit, where the seventh message includes the identification information of the NRF instance.

The seventh message may be a first configuration request message, and include the identification information of the NRF instance and the information about the NF instance. It should be noted that, the information about the NF instance may be obtained by the NM unit, and in this case, the seventh message may carry the information about the NF instance. Alternatively, the information about the NF instance may be pre-obtained by the DM unit, and in this case, the seventh message may not carry the information about the NF instance.

S603. The DM unit sends a first message to the NF instance, where the first message includes the identification information of the NRF instance.

For descriptions of the first message, refer to S502. Details are not described herein again.

In this way, when there are a plurality of NRF instances, the NM unit can indicate, to the NF instance using the DM unit, the NRF instance associated with the NF instance.

S604. The DM unit sends a ninth message to the NRF instance, where the ninth message includes the information about the NF instance.

The ninth message may be a fourth configuration request message, include the information about the NF instance, and be used to instruct the NRF to store the information about the NF instance.

S605. The NRF instance stores the information about the NF instance based on the ninth message.

S606. A terminal sends a service request message to the NF instance.

S607. The NF instance sends a third message to the NRF instance based on the service request message.

S608. The NRF instance queries information about another NF instance based on the third message.

S609. The NRF instance sends a query result to the NF instance.

For implementations of S605 to S609, refer to S504 to S508. Details are not described herein again.

FIG. 7 is a schematic flowchart of still another network function information management method according to an embodiment of this application. A management unit in FIG. 7 may be an NM unit or a DM unit. The method includes but is not limited to the following steps.

S701. A management network element obtains identification information of an NRF instance, where the NRF instance stores information about an NF instance.

For an implementation of S701, refer to S201. Details are not described herein again.

S702. The management network element establishes an association relationship between the NF instance and the NRF instance based on the identification information of the NRF instance.

After obtaining the identification information of the NRF instance, the management network element may establish the association relationship between the NF instance that needs to be configured currently and the NRF instance, such that when sending a related message, for example, a first message, to the NF instance, the management network element can directly obtain the NRF instance associated with the NF instance. It should be noted that a form of the association relationship is not specifically limited, provided that the form can indicate that the NF instance is associated with the NRF instance. For example, an association relationship list may be set up, and the list includes identification information of the NF instance and the identification information of the NRF instance associated with the NF instance.

In an optional implementation scenario, the management network element may configure the identification information of the NRF instance in a managed object of the NF instance. The identification information of the NRF instance is used to indicate the NRF instance associated with the NF instance. The managed object of the NF instance is a log file, used to store management information of the NF instance, in the management network element.

In this way, when there are a plurality of NRF instances, the management network element may establish the association relationship between the NF instance and the NRF instance, to instruct the NF instance to register with the NRF instance, update the information about the NF instance to the NRF instance, or query information about another NF instance from the NRF instance subsequently.

Further, the management network element may send a first message to the NF instance. The first message includes the identification information of the NRF instance.

The first message may be a configuration request message, and carries the identification information of the NRF instance. The identification information of the NRF instance is used to indicate the NRF instance associated with the NF instance. To be more specific, the NRF instance stores the information about the NF instance, and the NF instance queries information about another NF instance from the NRF instance.

In this way, the NF instance can directly register with the NRF instance, or update the information about the NF instance to the NRF instance, thereby reducing a time for configuring network function information, and optimizing a configuration procedure.

The foregoing mainly describes the solutions provided in the embodiments of this application from a perspective of interaction between different management units. It may be understood that, to implement the foregoing functions, the management network element, the NF instance, the NRF instance, and the management unit of the NF instance each include a corresponding hardware structure and/or software module for performing each function. With reference to the units and algorithm steps in the examples described in the embodiments disclosed in this application, the embodiments of this application may be implemented by hardware or a combination of hardware and computer software. Whether a function is performed by hardware or hardware driven by computer software depends on particular applications and design constraints of the technical solutions. A person skilled in the art may use a different method to implement the described function for each particular application, but it should not be considered that the implementation goes beyond the scope of the technical solutions in the embodiments of this application.

In the embodiments of this application, function module division may be performed on the management network element, the NF instance, the NRF instance, the management unit of the NF instance, and the like based on the foregoing method examples. For example, the division of function modules may be performed in correspondence to functions, or at least two functions may be integrated into one processing module. The integrated module may be implemented in a form of hardware, or may be implemented in a form of a software function module. It should be noted that, in the embodiments of this application, module division is an example, and is merely a logical function division. During actual implementation, other division manners may be used.

When an integrated module is used, FIG. 8A is a possible schematic block diagram of a management network element according to an embodiment of this application. A management network element 800 includes a processing module 802 and a communications module 803. The processing module 802 is configured to control and manage an action of the management network element. For example, the processing module 802 is configured to support the management network element 800 or support the management network element 800 using the communications module 803 in performing processes S101 to S103 in FIG. 3, processes S201 to S203 in FIG. 4, processes S301, S302, S306, S309, and S313 in FIG. 5A, processes S401 to S403, S407, S408, S411, S412, S415, and S416 in FIG. 5B and FIG. 5C, processes S501 to S503 in FIG. 6A, processes S601 to S604 in FIG. 6B, processes S701 and S702 in FIG. 7, and/or other processes of the technologies described in this specification. The communications module 803 is configured to support communication between the management network element 800 and an NF instance, between the management network element 800 and a management unit of the NF instance, between the management network element 800 and an NRF instance, between the management network element 800 and another management network element, or between the management network element 800 and another device. The management network element 800 may further include a storage module 801, configured to store program code and data of the management network element 800.

The processing module 802 may be a processor or a controller. For example, the processing module 802 may be a central processing unit (CPU), a general-purpose processor, a digital signal processor (DSP), an application-specific integrated circuit (ASIC), a field programmable gate array (FPGA) or another programmable logic device, a transistor logic device, a hardware component, or a combination thereof. The processing module 802 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 803 may be a communications interface, a transceiver, a transceiver circuit, or the like. The communications interface is a generic term, and may include a plurality of interfaces during actual application. For example, the communications interface may include an interface between the management network element 800 and the NF instance, an interface between the management network element 800 and the management unit of the NF instance, an interface between the management network element 800 and the NRF instance, an interface between the management network element 800 and the other management network element, and/or an interface between the management network element 800 and the other device. The storage module 801 may be a memory.

When the processing module 802 is a processor, the communications module 803 is a communications interface, and the storage module 801 is a memory, the management network element in this embodiment of this application may be a management network element 810 shown in FIG. 8B.

As shown in FIG. 8B, the management network element 810 includes a processor 812, a communications interface 813, and a memory 811. Optionally, the management network element 810 may further include a bus 814. The communications interface 813, the processor 812, and the memory 811 may be connected to each other using the bus 814. The bus 814 may be a peripheral component interconnect (PCI) bus, or an extended industry standard architecture (EISA) bus, or the like. The bus 814 may be classified into an address bus, a data bus, a control bus, and the like. For ease of representation, only one bold line is used to represent the bus in FIG. 8B, but this does not mean that there is only one bus or only one type of bus.

The management network element shown in FIG. 8A and FIG. 8B may be the "NM unit/NSMF unit" or the "DM unit/NSSMF unit" in FIG. 2.

Figure 9A:
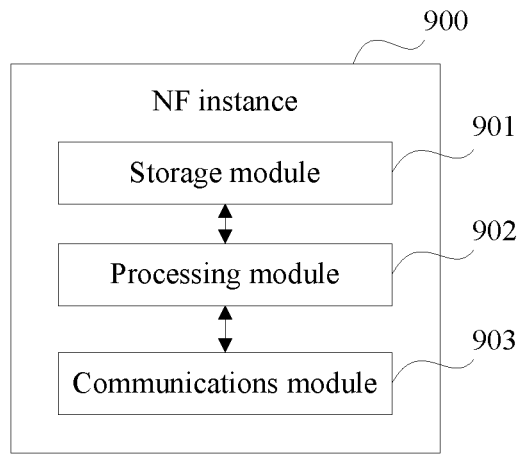
FIG. 9A is a schematic structural diagram of a network function instance according to an embodiment of this application.

When an integrated module is used, FIG. 9A is a possible schematic block diagram of an NF instance according to an embodiment of this application. An NF instance 900 includes a processing module 902 and a communications module 903. The processing module 902 is configured to control and manage an action of the NF instance 900. For example, the processing module 902 is configured to support the NF instance 900 using the communications module 903 in performing processes S205 and S207 in FIG. 4, processes S303, S307, and S311 in FIG. 5A, processes S404, S409, and S414 in FIG. 5B and FIG. 5C, process S506 in FIG. 6A, process S607 in FIG. 6B, and/or other processes of the technologies described in this specification. The communications module 903 is configured to support communication between the NF instance 900 and a management network element, between the NF instance 900 and an NRF instance, or between the NF instance 900 and a management unit of the NF instance. The NF instance 900 may further include a storage module 901, configured to store program code and data of the NF instance 900.

The processing module 902 may be a processor or a controller. For example, the processing module 902 may be a CPU, a general-purpose processor, a DSP, an ASIC, an FPGA or another programmable logic device, a transistor logic device, a hardware component, or any combination thereof. The processing module 902 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 903 may be a communications interface, a transceiver, a transceiver circuit, or the like. The communications interface is a generic term, and may include a plurality of interfaces during actual application. For example, the communications interface may include an interface between the NF instance 900 and the management network element, an interface between the NF instance 900 and the NRF instance, an interface between the NF instance 900 and the management unit of the NF instance, and/or another interface. The storage module 901 may be a memory.

Figure 9B:
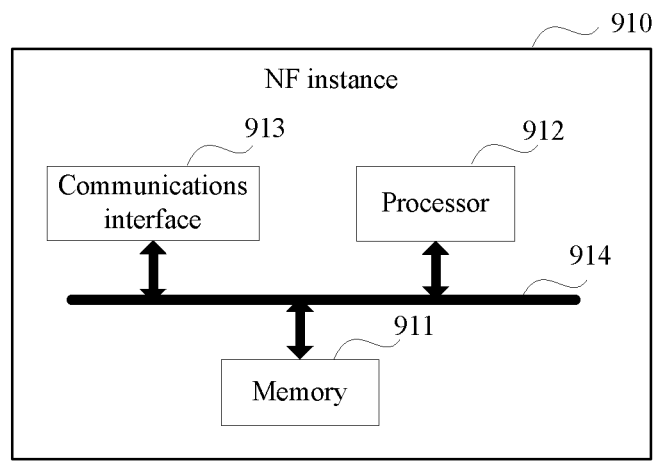
FIG. 9B is a schematic structural diagram of another network function instance according to an embodiment of this application.

When the processing module 902 is a processor, the communications module 903 is a communications interface, and the storage module 901 is a memory, the NF instance in this embodiment of this application may be an NF instance shown in FIG. 9B.

As shown in FIG. 9B, the NF instance 910 includes a processor 912, a communications interface 913, and a memory 911. Optionally, the NF instance 910 may further include a bus 914. The communications interface 913, the processor 912, and the memory 911 may be connected to each other using the bus 914. The bus 914 may be a PCI bus, an EISA bus, or the like. The bus 914 may be classified into an address bus, a data bus, a control bus, and the like. For ease of representation, only one bold line is used to represent the bus in FIG. 9B, but this does not mean that there is only one bus or only one type of bus.

The NF instance shown in FIG. 9A and FIG. 9B may be an NF instance in FIG. 1.

Figure 10A:
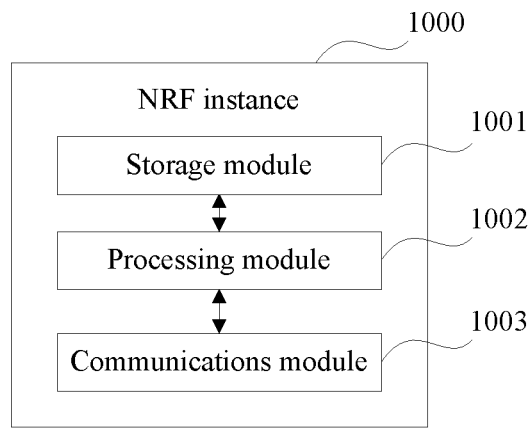
FIG. 10A is a schematic structural diagram of a network repository function instance according to an embodiment of this application.
Figure 10B:
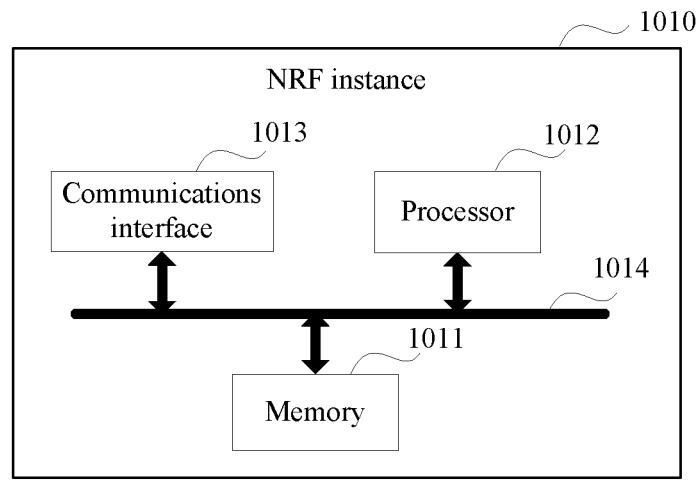
FIG. 10B is a schematic structural diagram of another network repository function instance according to an embodiment of this application.

An embodiment of this application further provides an NRF instance 1000. As shown in FIG. 10A and FIG. 10B, a schematic structural diagram of the NRF instance 1000 is similar to the foregoing schematic structural diagram of the NF instance. A module or a component included in the NRF instance 1000, e.g., a storage module 1001, a processing module 1002, and a communications module 1003, may correspondingly perform an action implemented by the NRF instance in the foregoing methods. Details are not described herein again. When the processing module 1002 is a processor, the communications module 1003 is a communications interface, and the storage module 1001 is a memory, the NRF instance in this embodiment of this application may be an NRF instance 1010 shown in FIG. 10B. As shown in FIG. 10B, the NRF instance 1010 includes a processor 1012, a communications interface 1013, and a memory 1011. Optionally, the NRF instance 1010 may further include a bus 1014. The communications interface 1013, the processor 1012, and the memory 1011 may be connected to each other using the bus 1014.

Figure 11A:
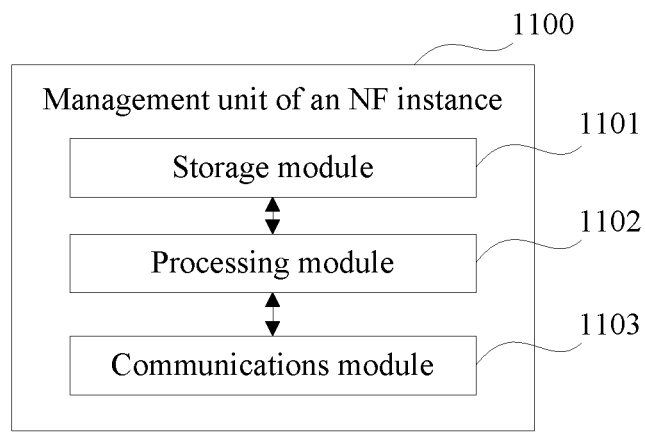
FIG. 11A is a schematic structural diagram of a management unit of a network function instance according to an embodiment of this application.
Figure 11B:
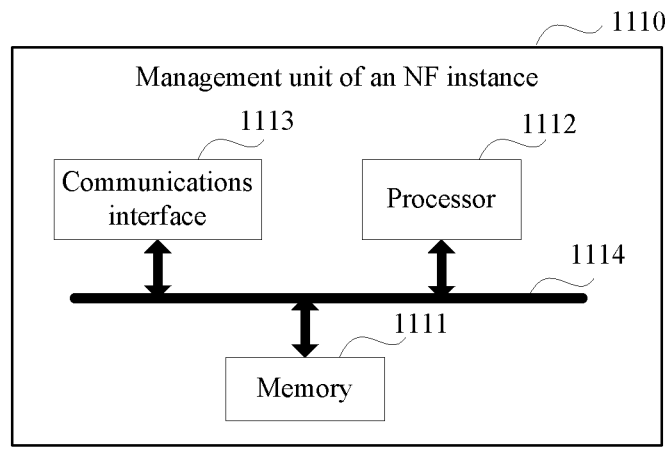
FIG. 11B is a schematic structural diagram of another management unit of a network function instance according to an embodiment of this application.

An embodiment of this application further provides a management unit 1100 of an NF instance. As shown in FIG. 11A and FIG. 11B, a schematic structural diagram of the management unit 1100 of the NF instance is similar to the foregoing schematic structural diagram of the management network element. A module or a component included in the management unit 1100 of the NF instance, e.g., a storage module 1101, a processing module 1102, and a communications module 1103, may correspondingly perform an action implemented by the management unit 1100 of the NF instance in the foregoing methods. Details are not described herein again. When the processing module 1102 is a processor, the communications module 1103 is a communications interface, and the storage module 1101 is a memory, the management unit in this embodiment of this application may be as management unit 1110 shown in FIG. 11B. As shown in FIG. 11B, the management unit 1110 includes a processor 1112, a communications interface 1113, and a memory 1111. Optionally, the management unit 1110 may further include a bus 1114. The communications interface 1113, the processor 1112, and the memory 1111 may be connected to each other using the bus 1114.

Methods or algorithm steps described with reference to the content disclosed in the embodiments of this application may be implemented by hardware or by a processor by executing a software instruction. The software instruction may include a corresponding software module. The software module may be stored in a random access memory (RAM), a flash memory, a read only memory (ROM), an erasable programmable read only memory (EPROM), an electrically erasable programmable read only memory (EEPROM), a register, a hard disk, a removable hard disk, a compact disc read only memory (CD-ROM), or any other form of storage medium well-known in the art. For example, a storage medium is coupled to a processor, such that the processor can read information from the storage medium or write information into the storage medium. Certainly, the storage medium may be a component of the processor. The processor and the storage medium may be located in an ASIC. In addition, the ASIC may be located in the management network element, the NF instance, the NRF instance, or the management unit of the NF instance. Certainly, the processor and the storage medium may alternatively exist in the management network element, the NF instance, the NRF instance, or the management unit of the NF instance as discrete components.

A person skilled in the art should be aware that in the foregoing one or more examples, all or some of the functions described in the embodiments of this application may be implemented using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions described in the embodiments of this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium that can be accessed by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state disk (SSD)), or the like.

In the foregoing implementations, the objectives, the technical solutions, and benefits of the embodiments of this application are further described in detail. It should be understood that the foregoing descriptions are merely example implementations of the embodiments of this application, but are not intended to limit the protection scope of the embodiments of this application. Any modification, equivalent replacement, improvement, or the like made based on the technical solutions of the embodiments of this application shall fall within the protection scope of the embodiments of this application.

What is claimed is:

1. A network function information management method, comprising:
    obtaining, by a network slice subnet management function unit, identification information of a network repository function (NRF) instance storing information about a network function (NF) instance, and wherein the identification information of the NRF instance indicates the NRF instance associated with the NF instance; and
    sending, by the network slice subnet management function unit, a first message to a network function manager unit, wherein the first message comprises the identification information of the NRF instance and the information about the NF instance, and wherein the identification information of the NRF instance comprises a name of the NRF instance or a network address of the NRF instance.

2. The method according to claim 1, wherein the information about the NF instance comprises slice information of a network slice to which the NF instance belongs.

3. The method according to claim 1, wherein the information about the NF instance comprises:
    an instance type of the NF instance,
    address information of the NF instance,
    domain name information of the NF instance,
    information about an NF group to which the NF instance belongs,
    a service area of the NF instance, or
    a discovery policy of the NF instance.

4. The method according to claim 1, wherein the first message is a configuration request message.

5. The method according to claim 1, further comprising establishing, by the network function manager unit, an association relationship between the NF instance and the NRF instance.

6. A network function information management method, comprising:
  receiving, by a network function manager unit, a first message from a network slice subnet management function unit, wherein the first message comprises information about a network function (NF) instance and identification information of a network repository function (NRF) instance storing information about the NF instance, wherein the identification information of the NRF instance comprises a name of the NRF instance or a network address of the NRF instance, and wherein the identification information of the NRF instance indicates the NRF instance associated with the NF instance; and
  establishing, by the network function manager unit, an association relationship between the NF instance and the NRF instance.

7. The method according to claim 6, wherein the information about the NF instance comprises slice information of a network slice to which the NF instance belongs.

8. The method according to claim 6, wherein the information about the NF instance comprises:
  an instance type of the NF instance,
  address information of the NF instance,
  domain name information of the NF instance,
  information about an NF group to which the NF instance belongs,
  a service area of the NF instance, or
  a discovery policy of the NF instance.

9. A network slice subnet management function unit, comprising:
  a communications interface; and
  a processor coupled to the communications interface and configured to:
    obtain identification information of a network repository function (NRF) instance storing information about a network function (NF) instance, wherein the identification information of the NRF instance indicates the NRF instance associated with the NF instance; and
    send a first message to a network function manager unit using the communications interface, wherein the first message comprises the identification information of the NRF instance and the information about the NF instance, and wherein the identification information of the NRF instance comprises a name of the NRF instance or a network address of the NRF instance.

10. The network slice subnet management function unit according to claim 9, wherein the information about the NF instance comprises slice information of a network slice to which the NF instance belongs.

11. The network slice subnet management function unit according to claim 9, wherein the information about the NF instance comprises:
  an instance type of the NF instance,
  address information of the NF instance,
  domain name information of the NF instance,
  information about an NF group to which the NF instance belongs,
  a service area of the NF instance, or
  a discovery policy of the NF instance.

12. The network slice subnet management function unit according to claim 9, wherein the first message is a configuration request message.

13. A network function manager unit, comprising:
  a communications interface; and
  a processor coupled to the communications interface and configured to:
    receive a first message from a network slice subnet management function unit using the communications interface, wherein the first message comprises information about a network function (NF) instance and identification information of a network repository function (NRF) instance storing information about the NF instance, wherein the identification information of the NRF instance comprises a name of the NRF instance or a network address of the NRF instance, and wherein the identification information of the NRF instance indicates the NRF instance associated with the NF instance; and
    establish an association relationship between the NF instance and the NRF instance.

14. The network function manager unit according to claim 13, wherein the information about the NF instance comprises slice information of a network slice to which the NF instance belongs.

15. The network function manager unit according to claim 13, wherein the information about the NF instance comprises:
  an instance type of the NF instance,
  address information of the NF instance,
  domain name information of the NF instance,
  information about an NF group to which the NF instance belongs,
  a service area of the NF instance, or
  a discovery policy of the NF instance.

16. A communication system, comprising:
  a network slice subnet management function unit configured to:
    obtain identification information of a network repository function (NRF) instance storing information about a network function (NF) instance, wherein the identification information of the NRF instance comprises a name of the NRF instance or a network address of the NRF instance, and wherein the identification information of the NRF instance indicates the NRF instance associated with the NF instance; and
    send a first message, wherein the first message comprises the identification information of the NRF instance and the information about the NF instance; and
  a network function manager unit configured to:
    receive the first message from the network slice subnet management function unit; and
    establish an association relationship between the NF instance and the NRF instance.

17. The communication system according to claim 16, wherein the information about the NF instance comprises slice information of a network slice to which the NF instance belongs.

18. The communication system according to claim 16, wherein the information about the NF instance comprises:
  an instance type of the NF instance,
  address information of the NF instance,
  domain name information of the NF instance,
  information about an NF group to which the NF instance belongs, a service area of the NF instance, or a discovery policy of the NF instance.

19. The communication system according to claim 16, wherein the first message is a configuration request message.

20. The communication system according to claim 16, wherein the network function manager unit is configured to establish the association relationship between the NF instance and the NRF instance such that the NF instance is able to directly register with the NRF instance.

\* \* \* \* \*